US011653013B2

(12) United States Patent
Loyd et al.

(10) Patent No.: US 11,653,013 B2
(45) Date of Patent: May 16, 2023

(54) GEOSPATIAL MEDIA RECORDING SYSTEM

(71) Applicant: Remote GeoSystems, Inc., Fort Collins, CO (US)

(72) Inventors: Bradon D. Loyd, Fort Collins, CO (US); Jeffrey W. Dahlke, Fort Collins, CO (US)

(73) Assignee: Remote Geosystems, Inc., Fort Collins, CO (US)

( * ) Notice: Subject to any disclaimer, the term of this patent is extended or adjusted under 35 U.S.C. 154(b) by 0 days.

(21) Appl. No.: 16/682,962

(22) Filed: Nov. 13, 2019

(65) Prior Publication Data

US 2020/0107038 A1  Apr. 2, 2020

Related U.S. Application Data

(63) Continuation of application No. 15/967,391, filed on Apr. 30, 2018, now Pat. No. 10,516,893, which is a continuation-in-part of application No. 15/881,355, filed on Jan. 26, 2018, which is a continuation of application No. 14/622,861, filed on Feb. 14, 2015, now Pat. No. 9,936,214.

(51) Int. Cl.
| | |
|---|---|
| H04N 19/46 | (2014.01) |
| G10L 19/018 | (2013.01) |
| H04N 21/45 | (2011.01) |
| H04N 21/433 | (2011.01) |
| H04N 19/44 | (2014.01) |
| H04N 21/422 | (2011.01) |
| G06F 16/29 | (2019.01) |
| G06F 16/787 | (2019.01) |

(52) U.S. Cl.
CPC ............. *H04N 19/46* (2014.11); *G06F 16/29* (2019.01); *G06F 16/787* (2019.01); *G10L 19/018* (2013.01); *H04N 19/44* (2014.11); *H04N 21/422* (2013.01); *H04N 21/4334* (2013.01); *H04N 21/4524* (2013.01)

(58) Field of Classification Search
CPC ....... H04N 19/46; H04N 19/44; G06F 16/787
See application file for complete search history.

(56) References Cited

U.S. PATENT DOCUMENTS

| | | |
|---|---|---|
| 5,170,164 A | 12/1992 | Lewis |
| 6,061,793 A | 5/2000 | Tewfik et al. |
| 6,091,816 A | 7/2000 | Woo |

(Continued)

OTHER PUBLICATIONS

I-Cubed. Game, Website, www.i3.com, originally downloaded Sep. 2, 2014, 2 total pages.

(Continued)

*Primary Examiner* — Zhubing Ren
(74) *Attorney, Agent, or Firm* — Craig R. Miles; CR Miles P.C.

(57) ABSTRACT

A computer implemented program executable to display a graphical user interface on a display surface of a computing device which by user indications retrieves a video and a geospatial representation in which one or more coordinate location indicators can be selected, and further functions to match location coordinates associated with selected coordinate location indicators with the plurality of images occurring between a beginning video image and an ending video image of the video.

10 Claims, 33 Drawing Sheets

(56) References Cited

U.S. PATENT DOCUMENTS

| | | | |
|---|---|---|---|
| 6,141,693 A | 10/2000 | Perlman et al. | |
| 6,931,660 B1 | 8/2005 | Kalluri et al. | |
| 7,239,311 B2 | 7/2007 | Dunn et al. | |
| 8,265,818 B2 | 9/2012 | Allport | |
| 8,666,219 B2 | 3/2014 | Wright et al. | |
| 8,687,841 B2 | 4/2014 | Malone et al. | |
| 9,936,214 B2 | 4/2018 | Loyd et al. | |
| 2002/0044690 A1 | 4/2002 | Burgess | |
| 2002/0131511 A1* | 9/2002 | Zenoni | H04B 1/202 375/240.28 |
| 2003/0052910 A1 | 3/2003 | Shiiyama | |
| 2003/0215110 A1 | 11/2003 | Phoads et al. | |
| 2005/0278371 A1 | 12/2005 | Funk et al. | |
| 2006/0056506 A1 | 3/2006 | Ho et al. | |
| 2007/0055441 A1 | 3/2007 | Retterath et al. | |
| 2008/0082264 A1 | 4/2008 | Hill et al. | |
| 2009/0064241 A1 | 3/2009 | Fellenstein et al. | |
| 2009/0136211 A1 | 5/2009 | Kikukawa et al. | |
| 2009/0323802 A1 | 12/2009 | Walters et al. | |
| 2010/0104187 A1 | 4/2010 | Broadbent | |
| 2011/0038594 A1 | 2/2011 | Symons et al. | |
| 2011/0090399 A1* | 4/2011 | Whitaker | H04N 21/4307 348/500 |
| 2011/0238503 A1 | 9/2011 | Naini | |
| 2012/0008693 A1 | 1/2012 | Yao | |
| 2012/0011575 A1* | 1/2012 | Cheswick | H04L 63/08 726/5 |
| 2012/0094768 A1 | 4/2012 | McCaddon et al. | |
| 2012/0295764 A1 | 11/2012 | Brammer | |
| 2013/0132841 A1* | 5/2013 | Herberger | G06F 3/01 715/719 |
| 2013/0222640 A1 | 8/2013 | Baek et al. | |
| 2013/0276017 A1* | 10/2013 | Walker | H04N 21/4524 725/31 |
| 2013/0305908 A1 | 11/2013 | Iwase et al. | |
| 2014/0086454 A1 | 3/2014 | Bauer et al. | |
| 2014/0253743 A1 | 9/2014 | Loxam et al. | |
| 2014/0309775 A1 | 10/2014 | Jenkinson | |
| 2015/0082168 A1 | 3/2015 | Brieussel | |
| 2015/0310895 A1 | 10/2015 | Shen et al. | |
| 2016/0066007 A1 | 3/2016 | Zhang | |
| 2016/0173825 A1 | 6/2016 | Polyakov et al. | |
| 2016/0241864 A1* | 8/2016 | Loyd | H04N 21/4524 |
| 2016/0265924 A1* | 9/2016 | Neyama | G01C 21/28 |
| 2016/0335796 A1 | 11/2016 | Roimela | |
| 2017/0236012 A1* | 8/2017 | Ulges | G01S 19/51 382/173 |

OTHER PUBLICATIONS

Intuitive Circuits, LLC. GeoStamp® Audio: GPS to Audio Encoder. On-line catalog, http://www.icircuits.com, originally downloaded Sep. 2, 2014, 3 total pages.

Red Hen Systems, LLC. GeoVideo for ESRI ArcGIS. Product Sheets, http://www.redhensystems.com, originally downloaded Sep. 2, 2014, 2 total pages.

Red Hen Systems, LLC. isWHERE. On-line catalog, http://www.redhensystems.com, originally downloaded Sep. 2, 2014, 1 page.

Red Hen Systems, LLC. MediaMapper 5.3. Product Sheets, http://www.redhensystems.com, originally downloaded Sep. 2, 2014, 2 total pages.

Red Hen Systems, LLC. Video Mapping Encoders. On-line catalog, http://www.redhensystems.com, originally downloaded Sep. 2, 2014, 1 page.

Red Hen Systems, LLC. VMS-333. Product Sheets, http://www.redhensystems.com, originally downloaded Sep. 2, 2014, 4 total pages.

Red Hen Systems, LLC. VMS-HDII. Product Sheets, http://www.redhensystems.com, originally downloaded Sep. 2, 2014, 2 pages.

VISION4CE. Grip DVR. On-line catalog, http://www.vision4ce.com, originally downloaded Sep. 2, 2014, 1 page.

VISION4CE. Truper PC & DVR. On-line catalog, http://www.vision4ce.com, originally downloaded Sep. 2, 2014, 1 page.

U.S. Appl. No. 15/881,355, filed Jan. 26, 2018.

PCT International Patent Application No. PCT/US16/14084; International Search Report and Written Opinion of the International Searching Authority dated Mar. 29, 2016;15 pages.

U.S. Appl. No. 15/881,355; Office Action dated Mar. 11, 2019.

U.S. Appl. No. 15/881,355; Office Action dated Sep. 6, 2019.

U.S. Appl. No. 15/881,355; Office Action dated Jun. 3, 2020.

U.S. Appl. No. 15/967,391; Office Action dated May 8, 2019.

* cited by examiner

GEOSPATIAL MEDIA RECORDING SYSTEM

This United States Patent Application is a continuation of U.S. patent application Ser. No. 15/967,391, filed Apr. 30, 2018, which is a continuation-in-part of U.S. patent application Ser. No. 15/881,355, filed Jan. 26, 2018, which is a continuation of U.S. patent application Ser. No. 14/622,861, filed Feb. 14, 2015, now U.S. Pat. No. 9,936,214, issued Apr. 3, 2018, each hereby incorporated by reference herein.

I. FIELD OF THE INVENTION

A computer implemented geospatial media recording system which receives a global positioning signal from a global positioning system, a video stream from a video recorder and an audio stream from an audio recorder and encodes the global positioning system signal as global positioning data continuously embedded at intervals in the video stream or the audio stream at a frequency at the upper end or outside of the human audible range as a combined data stream which can be stored as one or more video files in the memory element of a computer retrievable by operation of a geospatial media program to display a video in a first display area and a geospatial representation in second display area on a display surface and further functions to extract global positioning data from the video to display a plurality of coordinate location indicators with associated metadata in the geospatial representation each at the coordinate location associated with the global positioning data embedded in the video.

II. BACKGROUND OF THE INVENTION

Conventionally, recordings can include embedded attribute data in the data stream enabling playback of the recording containing the attribute data by a playback device. The attribute data can contain information unique to the recording. However, conventional attribute data embedding methods may locate the attribute data at the beginning or the end of the data stream which may result in loss of the attribute data with respect data stream segments excised from the data stream. Additionally, attribute data embedded within recordings within the audible range of human hearing may generate background noise during playback of the recording and conventionally embedded attribute data within recordings can be lost when transcoded. Moreover, conventional playback of a recordings embedded with attribute data may not include global positioning data continuously embedded at intervals in the recording nor a coordinate encoded geographic space adapted to identify the location coordinates associated with real time recording.

There would be a substantial advantage in an inventive geospatial recorder operable to continuously embed global positioning data at intervals in the data stream of a recording at an embedding frequency at the upper end or outside the audible range of human hearing and to provide a geospatial recording system operable to concurrently playback the recording and display a geospatial representation of a coordinate encoded geographic space adapted to generate one or more coordinate location indicators corresponding to location coordinates continuously embedded at intervals in the data stream of the recording and to provide editors useful in editing the data stream or data stream segments of the recording without loss of the embedded global positioning data.

III. SUMMARY OF THE INVENTION

Accordingly, a broad object of particular embodiments of the invention can be to provide a geospatial recorder having a processor in communication with a memory element containing a geospatial recording application (computer readable media) executable by the processor to receive and decode a global positioning signal generated by a global positioning system, receive a video stream from a video recorder, and receive an audio stream from an audio recorder and to further function to generate a combined data stream containing video stream data and audio stream data one or both continuously embedded at intervals with the global positioning data and as to particular embodiments continuously embed the audio stream at intervals with the global positioning data at an embedding frequency at an upper end of or outside of the human audible range or as a text overlay in the video stream data.

Another broad object of particular embodiments of the invention can be to provide a geospatial recorder having a processor in communication with a memory element containing a geospatial recording application executable by the processor to generate a combined data stream containing video stream data and audio stream data one or both continuously embedded at intervals with the global positioning data and to further function to receive waypoint signals to set waypoints (or bookmarks) in the global positioning data each waypoint associated with a video image and the corresponding embedded global positioning data in the combined data stream) for retrievable storage in the memory element as a companion file.

Another broad object of particular embodiments of the invention can be to provide a geospatial recording system in which one or a plurality of nodes are connected to the geospatial recorder or connected to one or more server computers which retrievably store the combined data stream generated by the geospatial recorder and further include a processor in communication with a memory element containing a geospatial media program (computer readable media) executable by the processor to concurrently display on a display surface of one or more nodes a graphical user interface including playback of a video associated with video stream data embedded with global positioning data, and including a geospatial representation of a coordinate encoded geographic space including coordinate location indicators located at coordinate locations in the geospatial representation corresponding to the location coordinates included in the embedded global positioning data associated with the video images in the video.

Another broad object of particular embodiments of the invention can be to provide a geospatial recording system including a processor in communication with a memory element containing a geospatial media program (computer readable media) executable by the processor to display an image on the display surface of a node and to further display a global positioning data entry field into which location coordinates longitude latitude, and altitude (respectively X, Y, Z) can be entered to associate or overwrite location coordinates associated with the image.

Another broad object of particular embodiments of the invention can be to provide a geospatial recording system including a processor in communication with a memory element containing a geospatial media program (computer readable media) executable by the processor to display on the display surface of a node a video associated with video stream data embedded with global positioning data and to further display a geospatial representation of a coordinate encoded geographic space including coordinate location indicators located at coordinate locations in the geospatial representation corresponding to the location coordinates included in the embedded global positioning data associated with the video images in the video and to display a video segment selector for selection of a video segment start point and a video segment end point to identify a video segment and associated data stream segment and to extract the video segment and associated data stream segment and to splice the video segment start point to the video segment end point allowing playback of the video with omission of the defined video segment.

Another object of particular embodiments of the invention is to provide a geospatial recording system including a processor in communication with a memory element containing a geospatial media program (computer readable media) executable by the processor to display on the display surface of a node a video associated with video stream data embedded with global positioning data and to display a geospatial representation of a coordinate encoded geographic space including coordinate location indicators located at coordinate locations in the geospatial representation corresponding to the location coordinates included in the embedded global positioning data associated with the video images in the video and to display an annotation entry field including one or more annotation entry areas for entry of annotations and associating the annotation with a video image of the video.

Naturally, further objects of the invention are disclosed throughout other areas of the specification, drawings, photographs, and claims.

IV. BRIEF DESCRIPTION OF THE DRAWINGS

Figure 3:
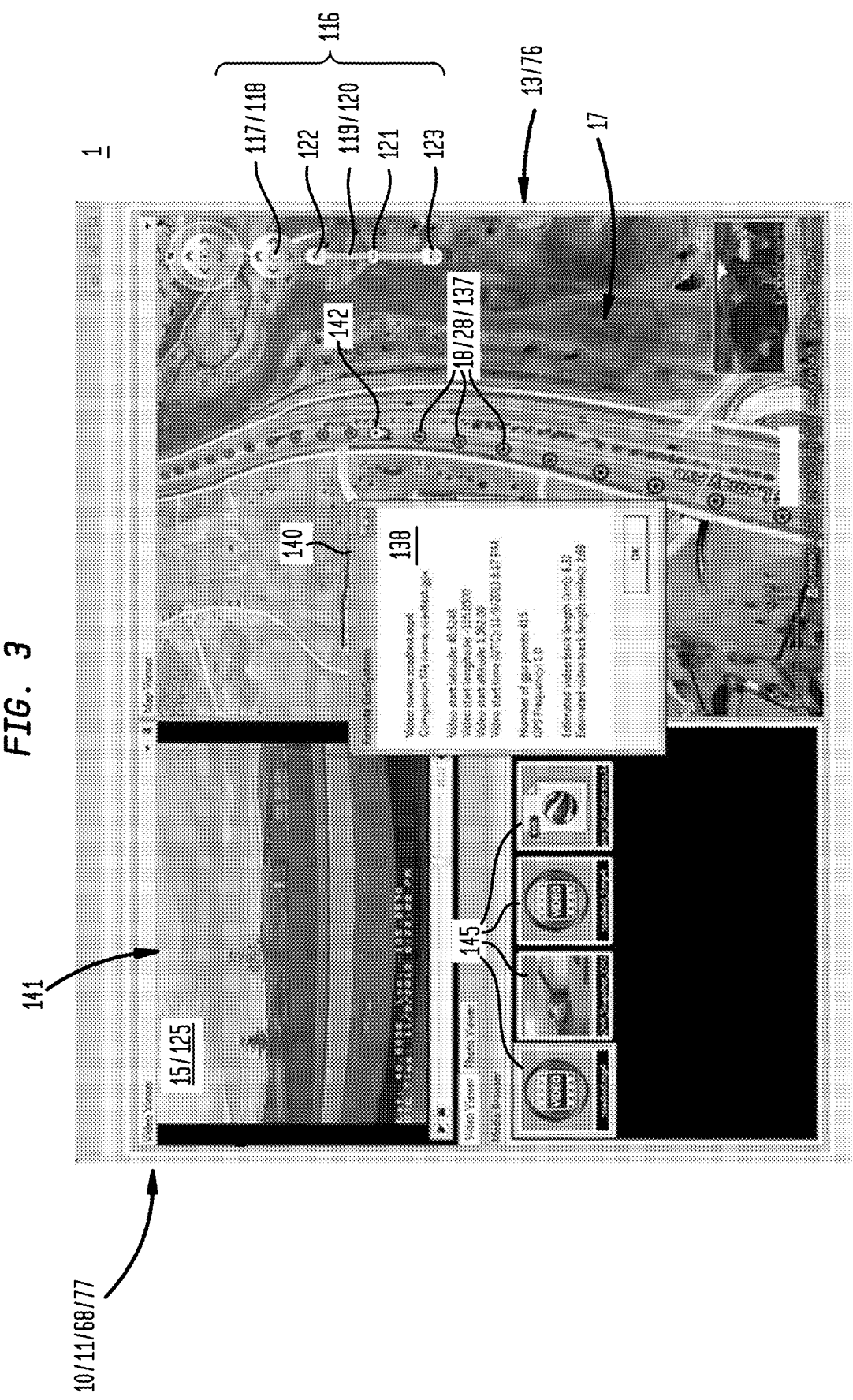

FIG. 3 is an illustration of particular embodiment of a graphic user interface which concurrently displays on a display surface a video generated from a combined data stream continuously embedded at intervals with global positioning data and a geospatial representation including a plurality of coordinate location indicators each located the location coordinates included in global positioning data associated with one more video images of the video.

Figure 4:
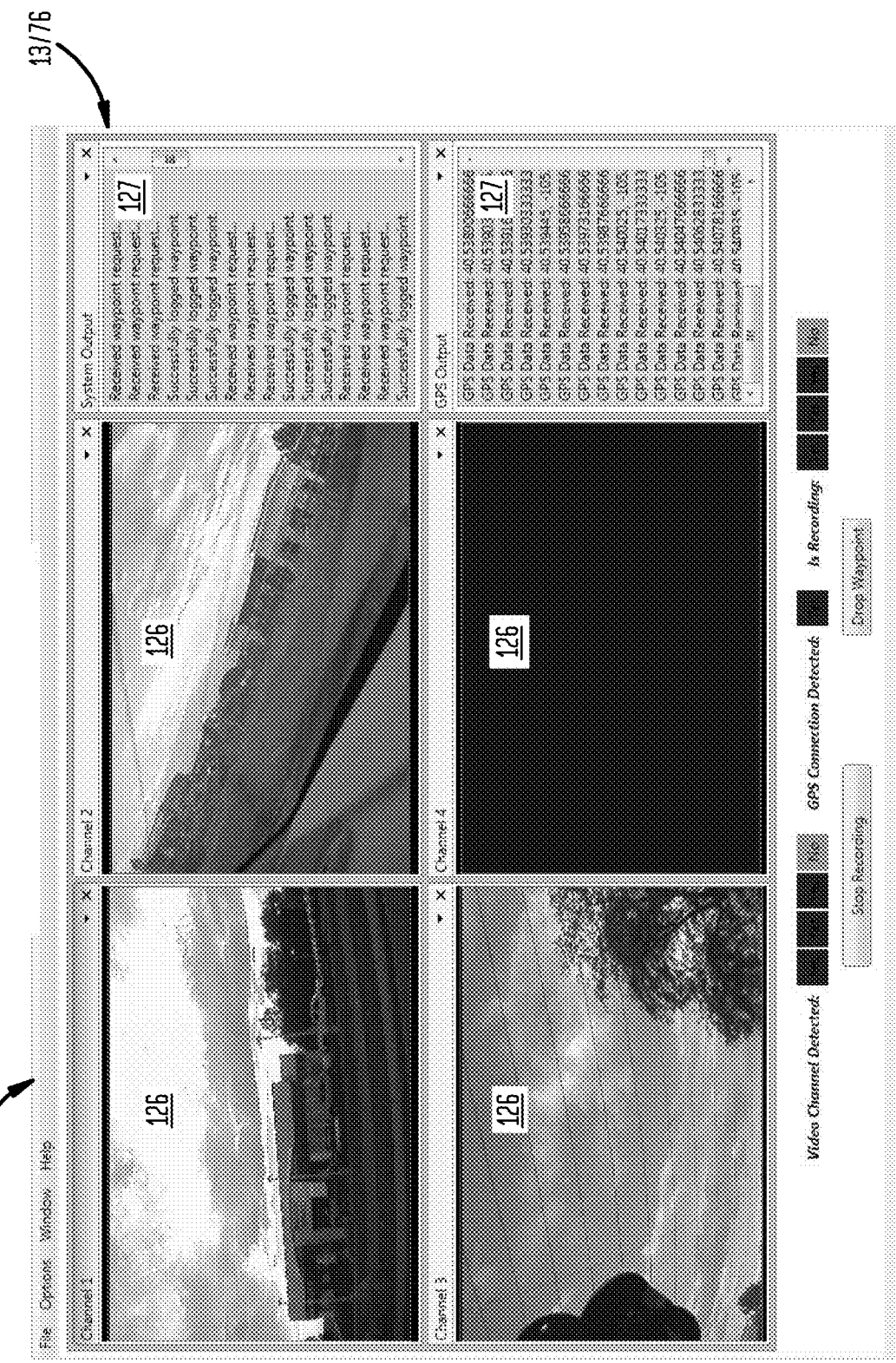

FIG. 4 is an illustration of particular embodiment of a graphic user interface which concurrently displays on a display surface a plurality of videos generated from a plurality of combined data stream each continuously embedded at intervals with global positioning data and a corresponding plurality of status indicators pertaining to global positioning data received or waypoints bookmarked in the global positioning data.

Figure 5:
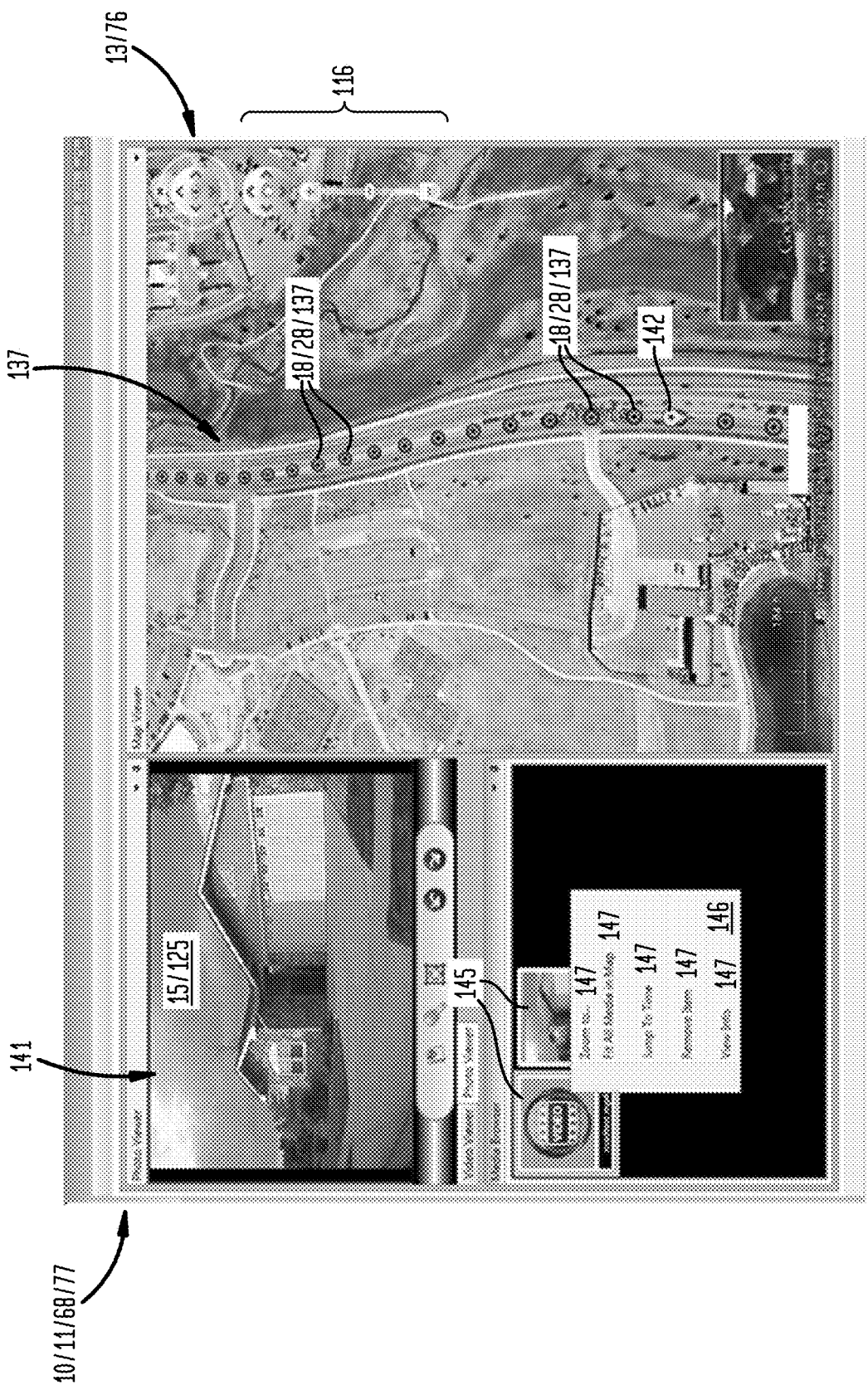

FIG. 5 is an illustration of particular embodiment of a graphic user interface which displays media icons associated with a media file retrievably stored in a media database which upon retrieval concurrently displays on a display surface a video generated from a combined data stream continuously embedded at intervals with global positioning data and a geospatial representation including a plurality of coordinate location indicators each located in the geospatial representation at the location coordinates included in global positioning data associated with the video.

Figure 6:
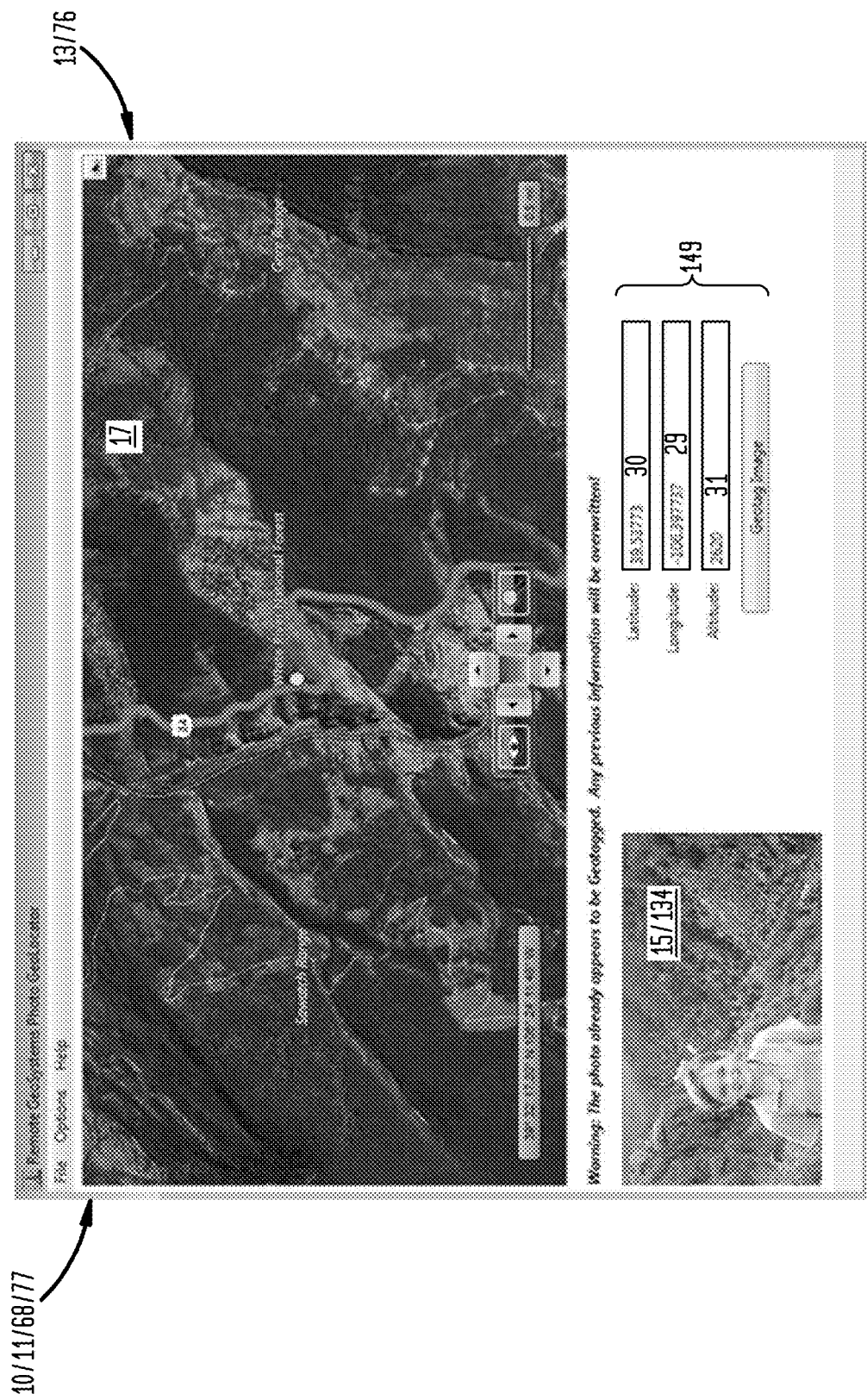

FIG. 6 is an illustration of particular embodiment of a graphic user interface which concurrently displays an image associated or associable with global positioning data and a global positioning data entry field displaying location coordinates corresponding to the associated global positioning data or in which location coordinates can be entered or edited for association with the image.

Figure 7:
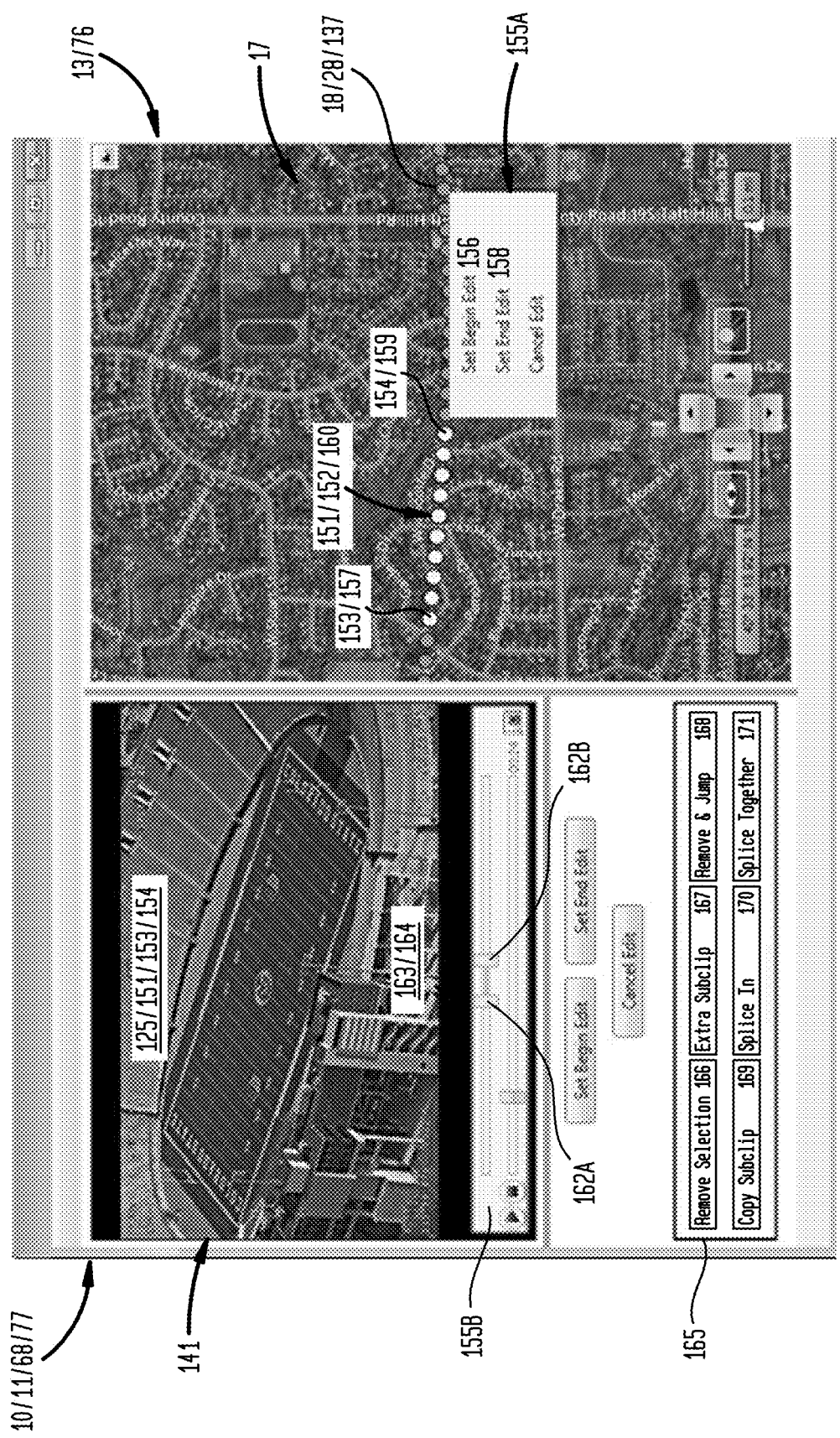

FIG. 7 is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates included in the global positioning data associated with one more video images of the video and displays a video segment selector which allows one video image or video segment including a plurality of video images to be selected.

Figure 8A:
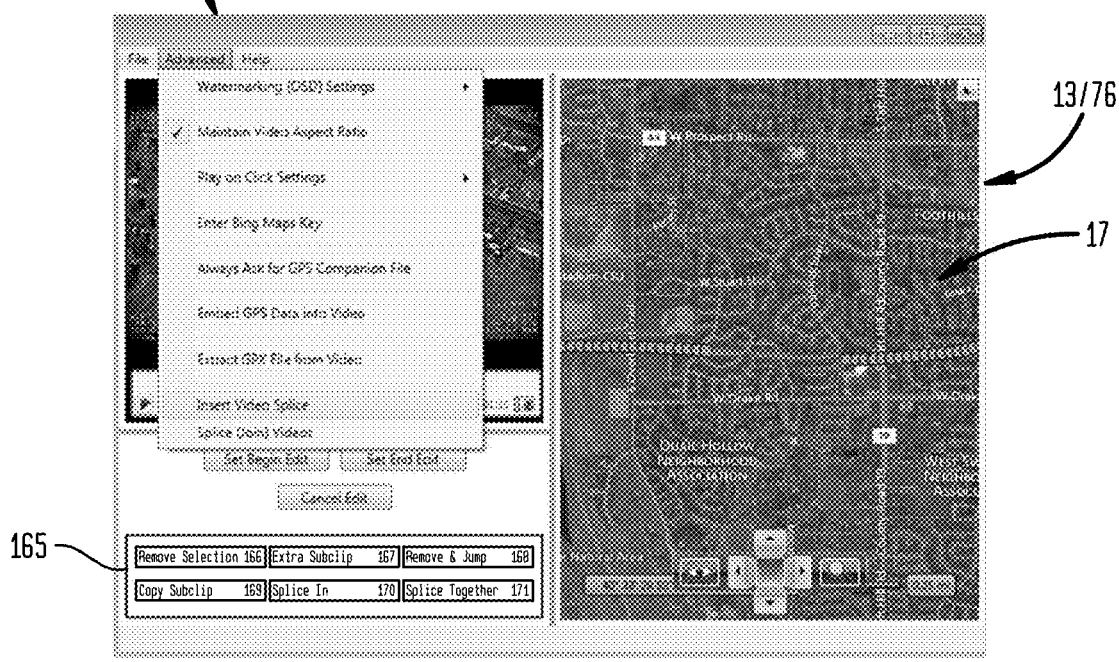

FIG. 8A is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates included in the global positioning data associated with one more video images of the video in which a video segment has been selected having a video segment start point and a video segment end point with the selected video segment deleted from the video and the corresponding coordinate location indicators deleted from the geospatial representation.

Figure 8B:

FIG. 8B is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates corresponding to the global positioning data associated with one more video images of the video in which a selected video segment between a video segment start point and a video segment end point has been extracted from the video and the corresponding coordinate location indicators between the video segment start point and a video segment end point have been removed from the geospatial representation and the a video segment start point and a video segment end point spliced as concurrently shown in the geospatial representation by locating the coordinate location indicators corresponding to the video segment start point and a video segment end point proximate each other with concurrent removal of geospatial representation associated with the extracted video segment.

Figure 9:
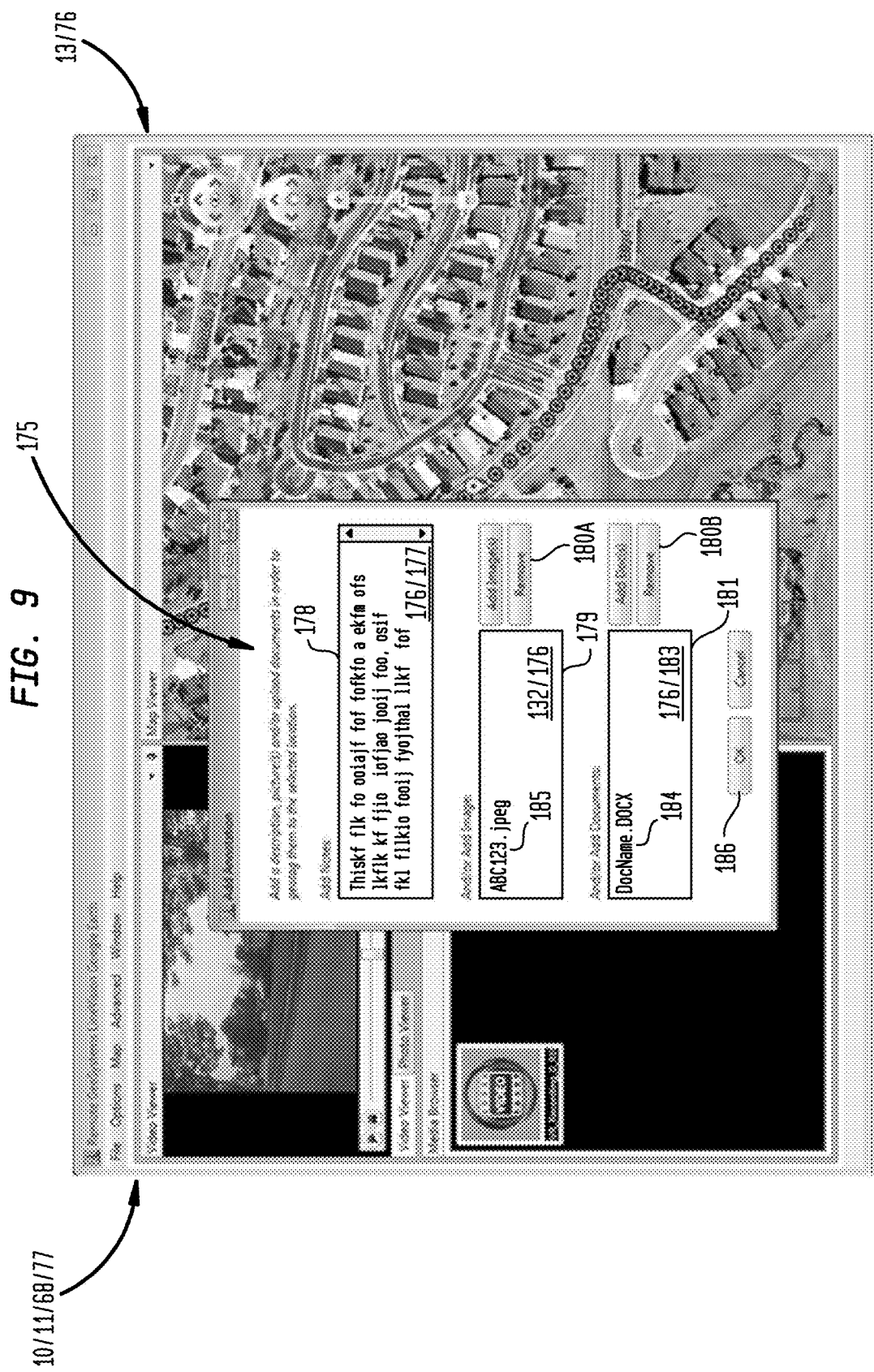

FIG. 9 is an illustration of a particular embodiment of a graphic user interface which concurrently displays on a display surface a video generated from a combined data stream continuously embedded at intervals with global positioning data and a geospatial representation including a plurality of coordinate location indicators each located at the location coordinates corresponding to the global positioning data associated with one more video images of the video and an annotation entry field having a plurality of annotation entry areas in which annotations can be entered for association with a video image and corresponding coordinate location in the geospatial representation.

Figure 10:
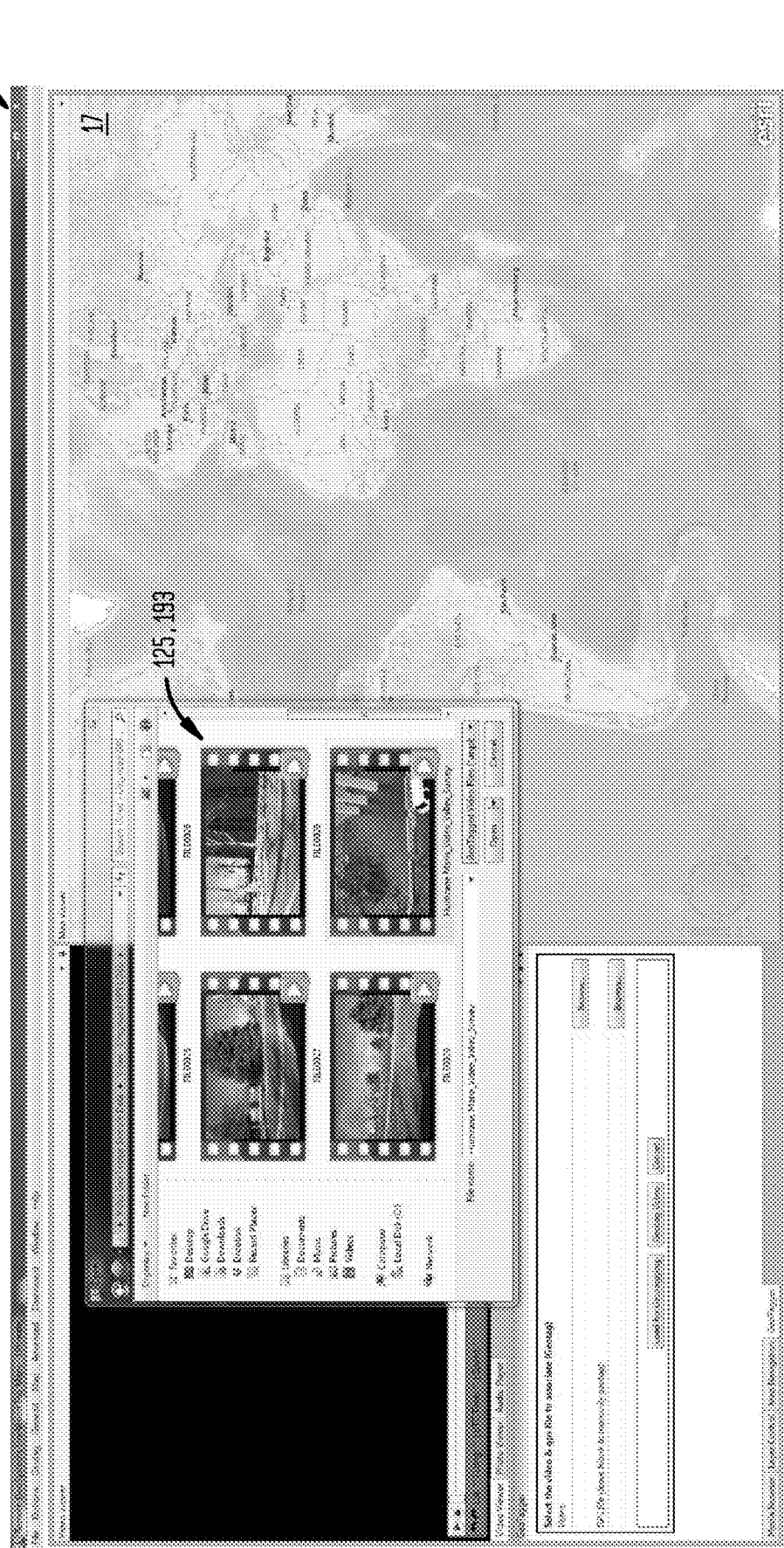

FIG. 10 is an illustration of a particular embodiment of a graphic user interface in which a user can select for retrieval a video for depiction in the graphical user interface on the display surface of a computing device.

Figure 11:
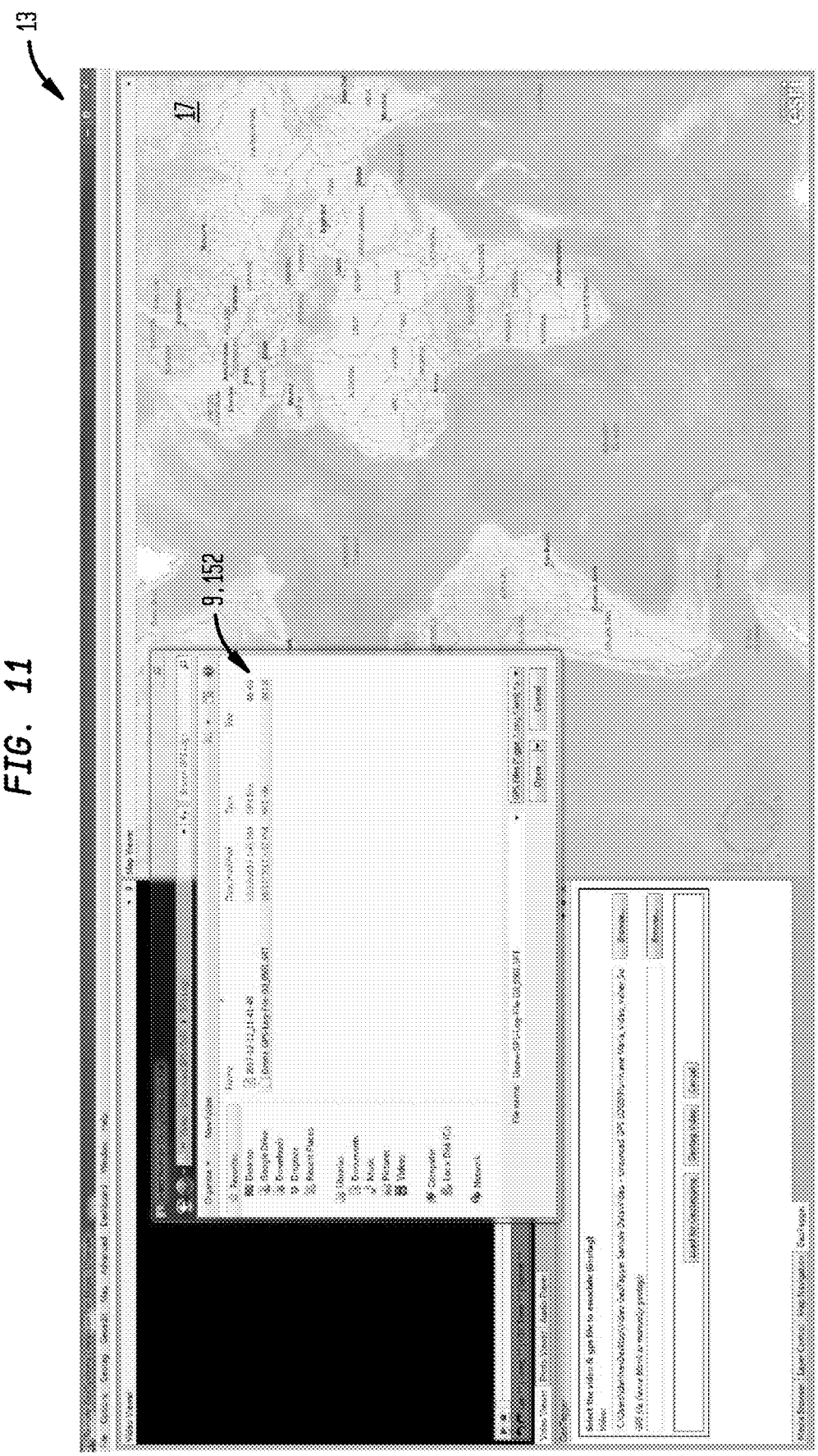

FIG. 11 is an illustration of a particular embodiment of a graphic user interface in which a user can select for retrieval global positioning data to be associated with the retrieved video.

Figure 12:
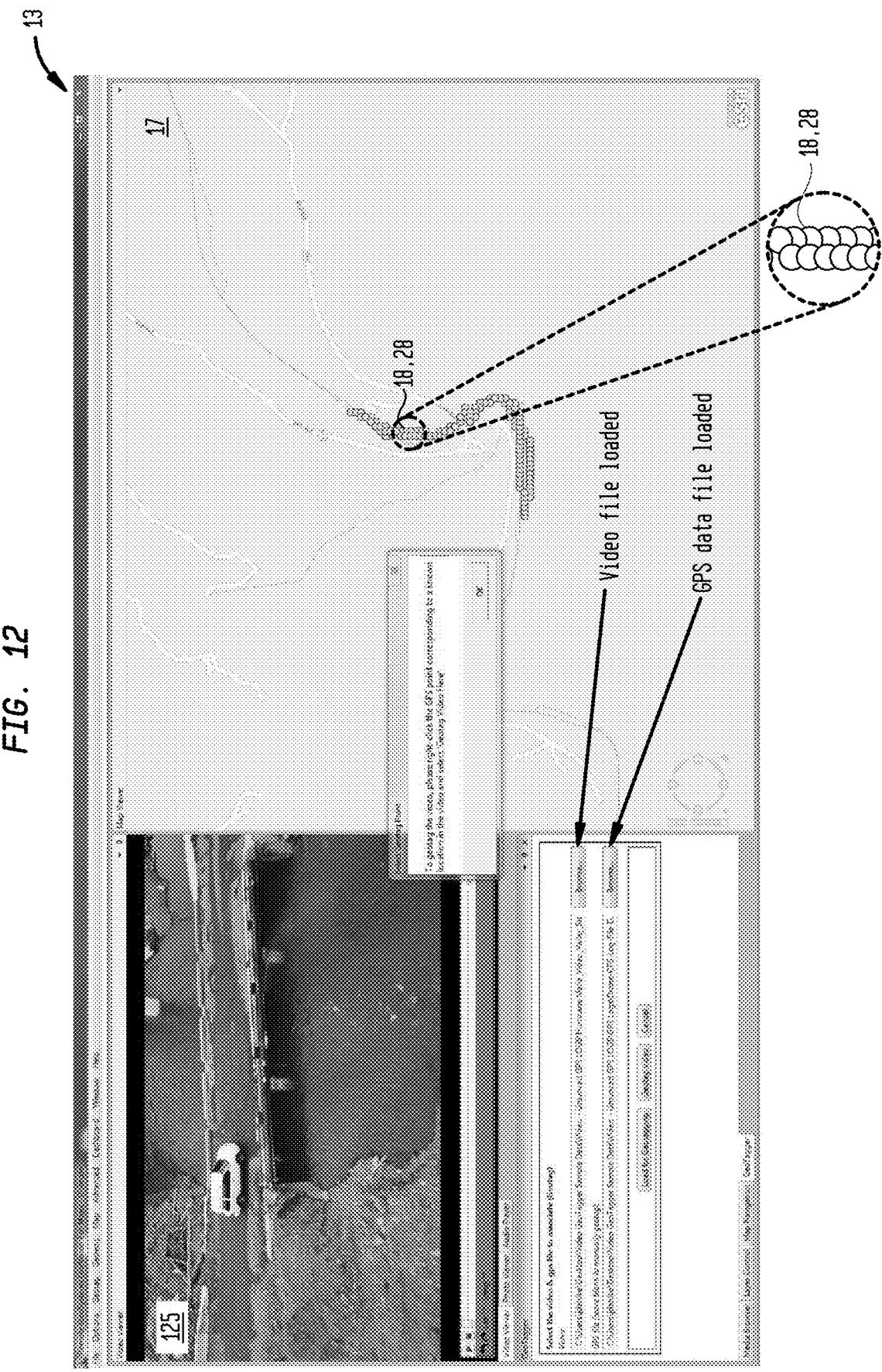

FIG. 12 is an illustration of a particular embodiment of a graphic user interface which depicts the selected video in the graphical user interface on the display surface of the computing device and which depicts coordinate location indicators at coordinate locations in a geospatial representation which correspond to the location coordinates contained in the selected global positioning data.

Figure 13:
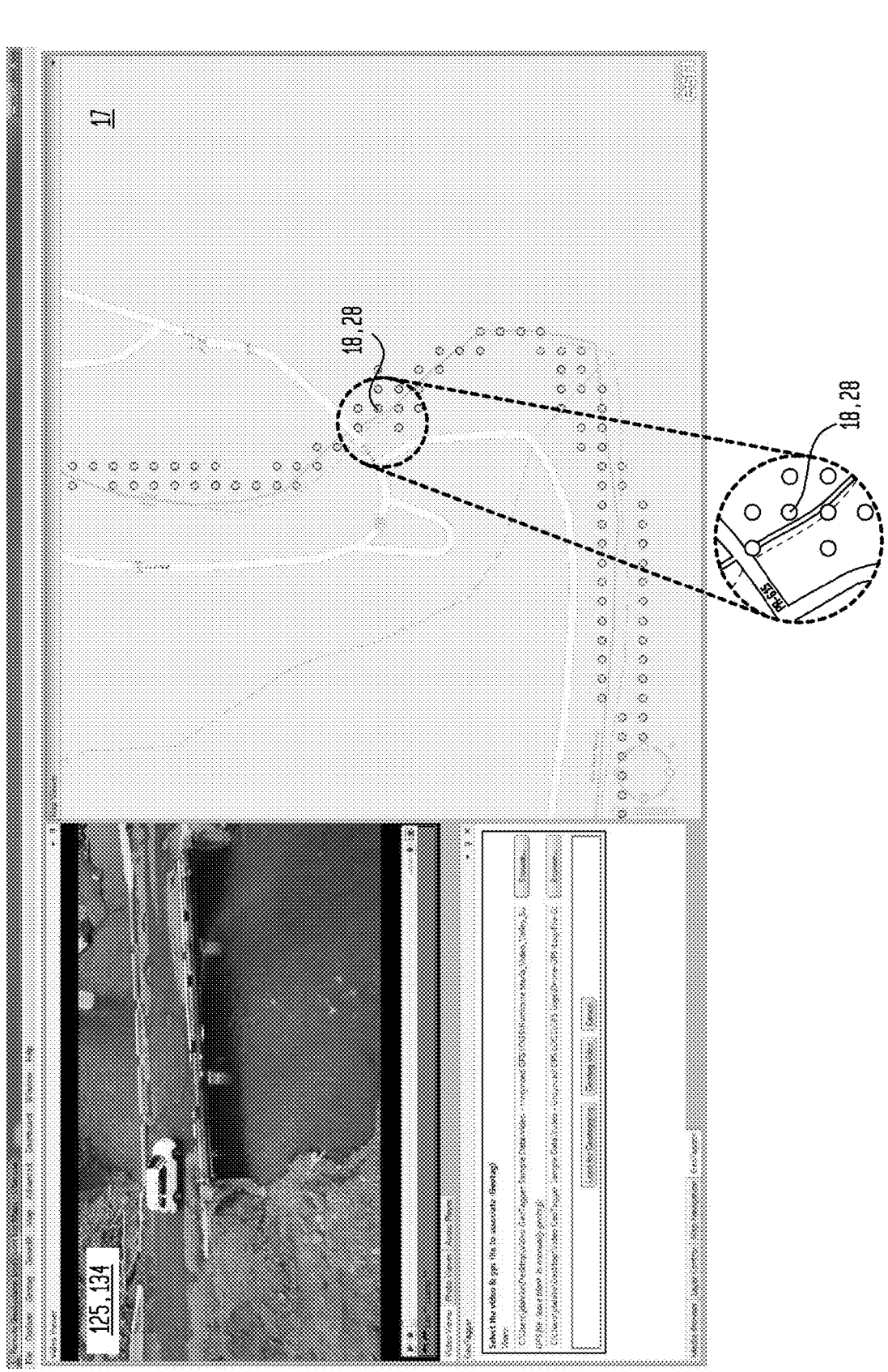

FIG. 13 is an illustration of a particular embodiment of a graphic user interface in which a user can select an image in the video to depict in the graphical user interface on the display surface of the computing device and locate the coordinate location indicator in the geospatial representation which most closely represents the location coordinates in the global positioning data at which a video recorder recorded the selected video image.

Figure 14:
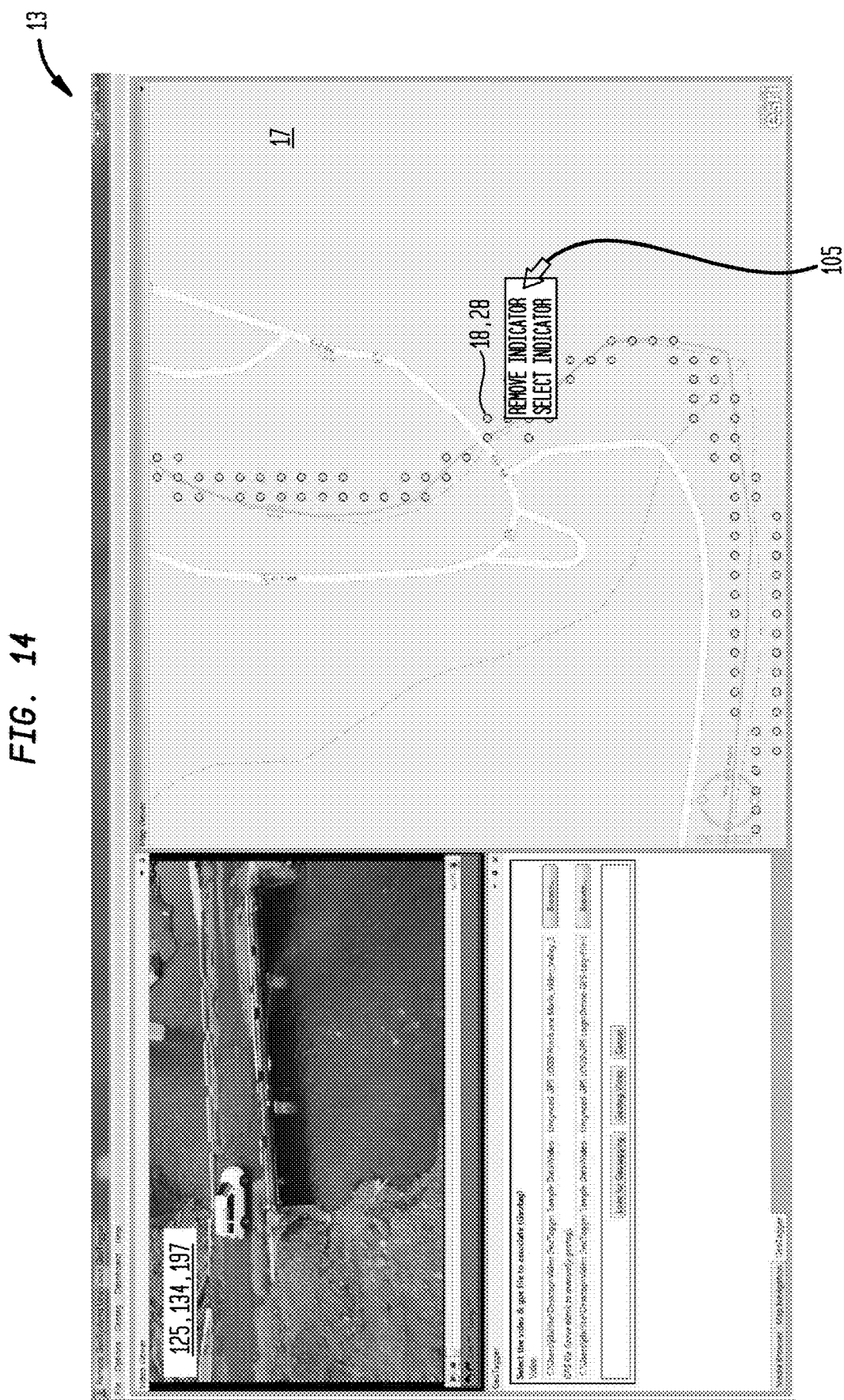

FIG. 14 is an illustration of a particular embodiment of a graphic user interface in which a user can select the coordinate location indicator in the geospatial representation to correspondingly select the location coordinates of a global positioning point in the global positioning data to associate with the selected video image.

Figure 15:
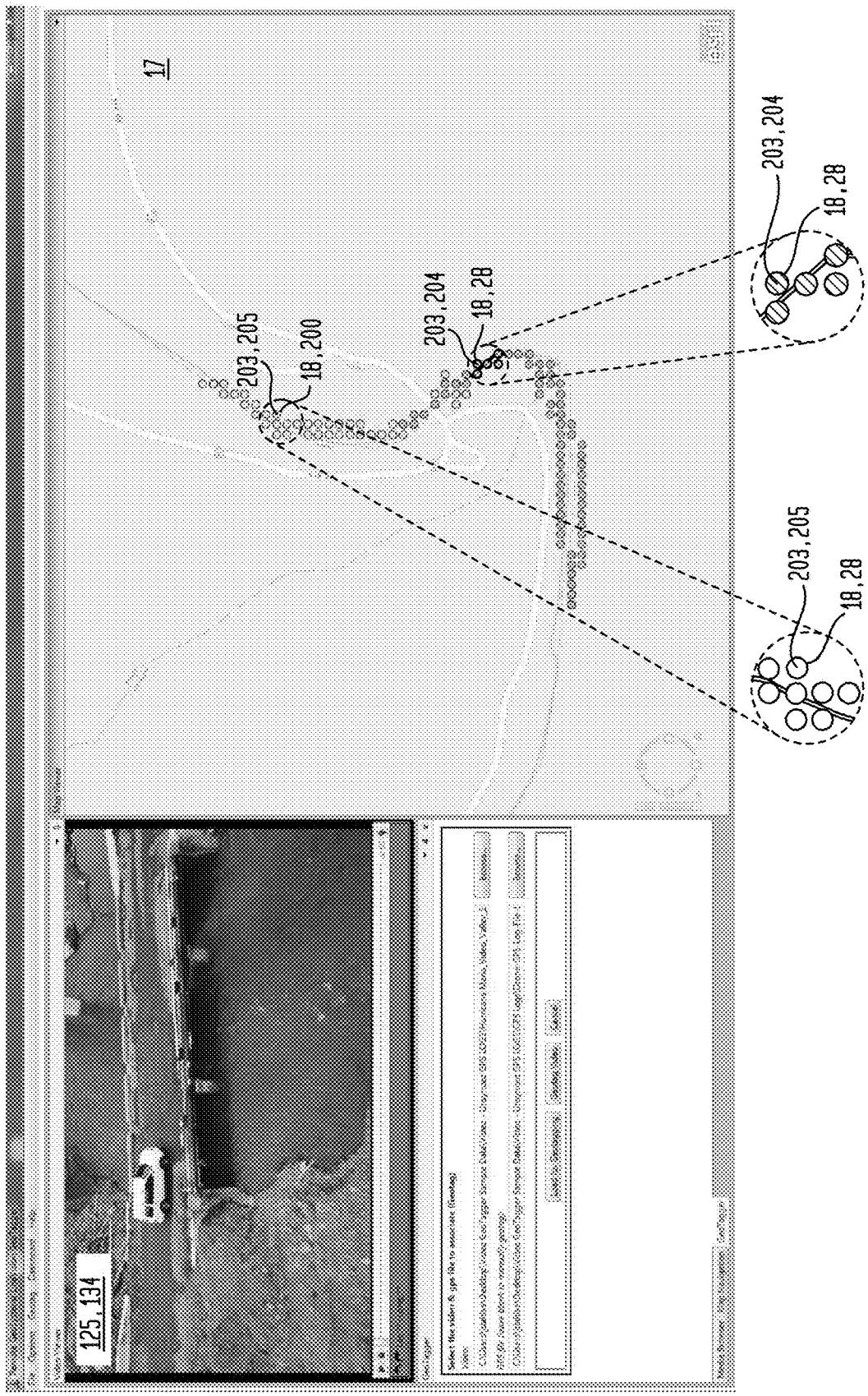

FIG. 15 is an illustration of a particular embodiment of a graphic user interface which shows graphical indicia associated with each of said plurality of coordinate location indicators in the geospatial representation to differentiate the plurality of coordinate location indicators corresponding to the plurality of global positioning data points matched to the plurality of images occurring between the beginning video image and the ending video image from the plurality of coordinate indicators corresponding to the plurality of global positioning data points unmatched to the plurality of images occurring between the beginning video image and the ending video image.

Figure 16:
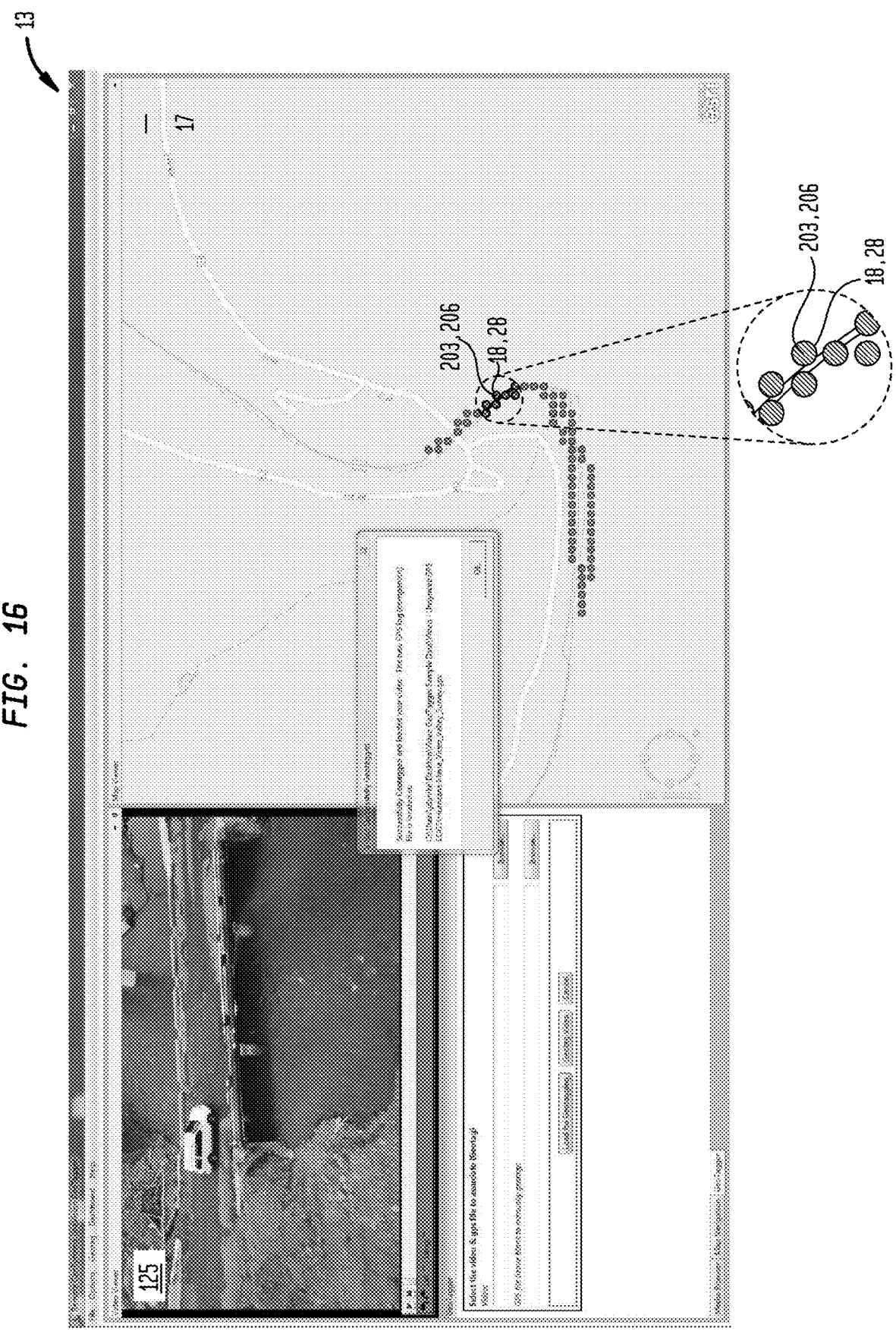

FIG. 16 is an illustration of a particular embodiment of a graphic user interface in which the plurality of coordinate location indicators corresponding to each of the plurality of global positioning points unmatched to the plurality of images occurring between the beginning video image and the ending video image in said plurality of video images have been removed.

Figure 17:
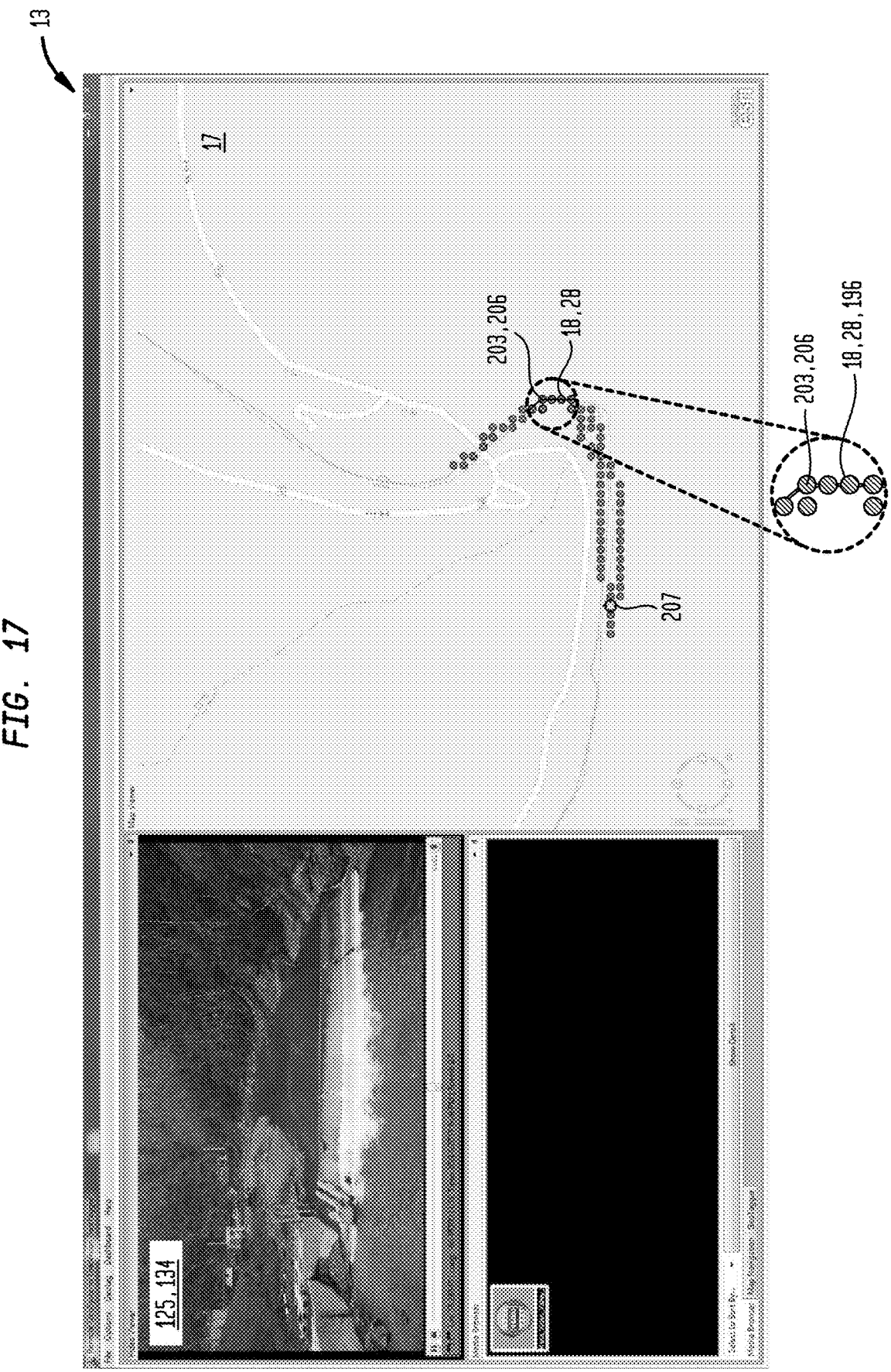

FIG. 17 is an illustration of a particular embodiment of a graphic user interface in which an image location identifier associates with the corresponding one of the coordinate location indicators matched to depicted video image depicted in the graphical user interface.

Figure 18:
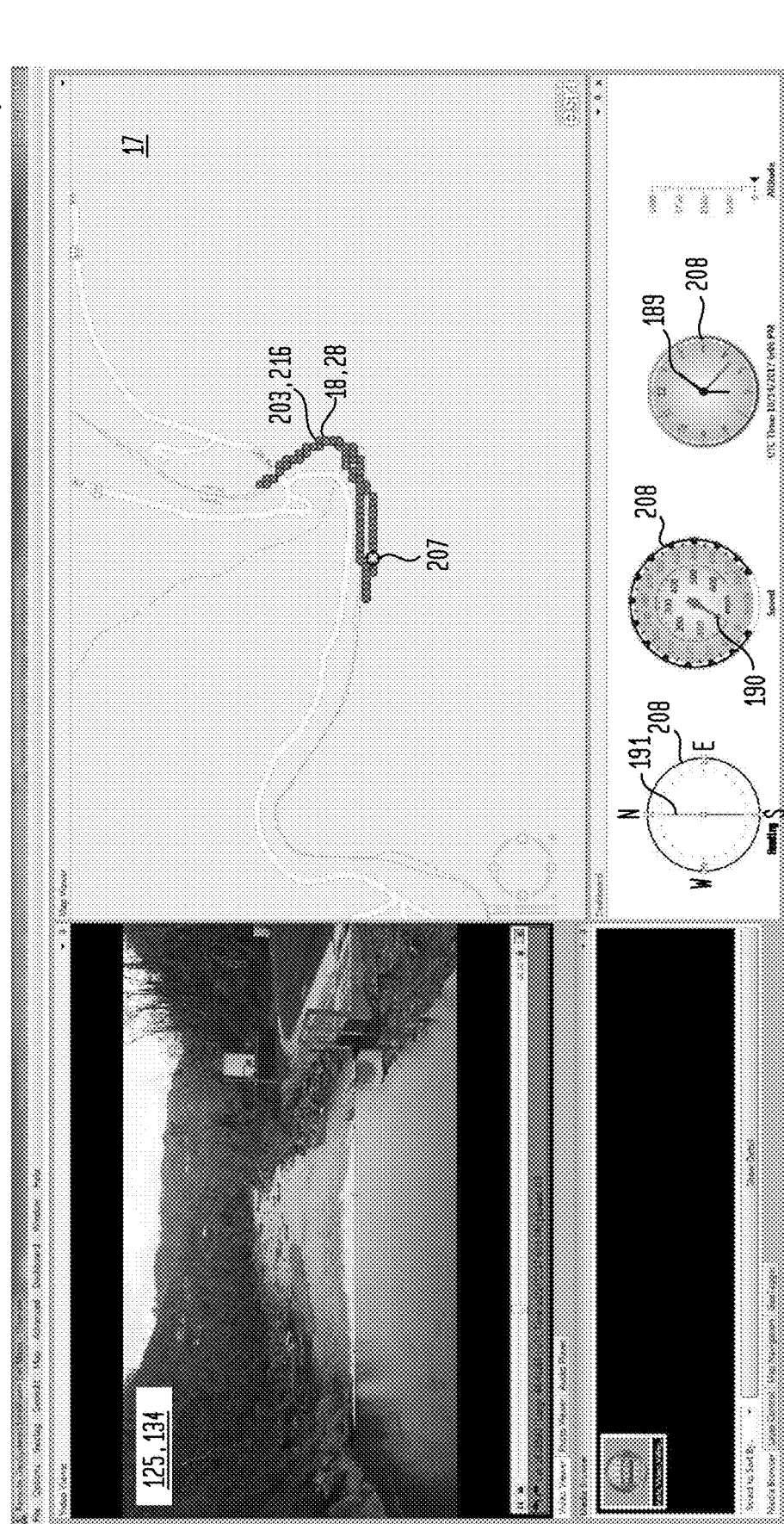

FIG. 18 is an illustration of a particular embodiment of a graphic user interface which depicts one or more gauges to represent metadata values associated with the global positioning point identified in the geospatial representation by the image location identifier.

Figure 19:
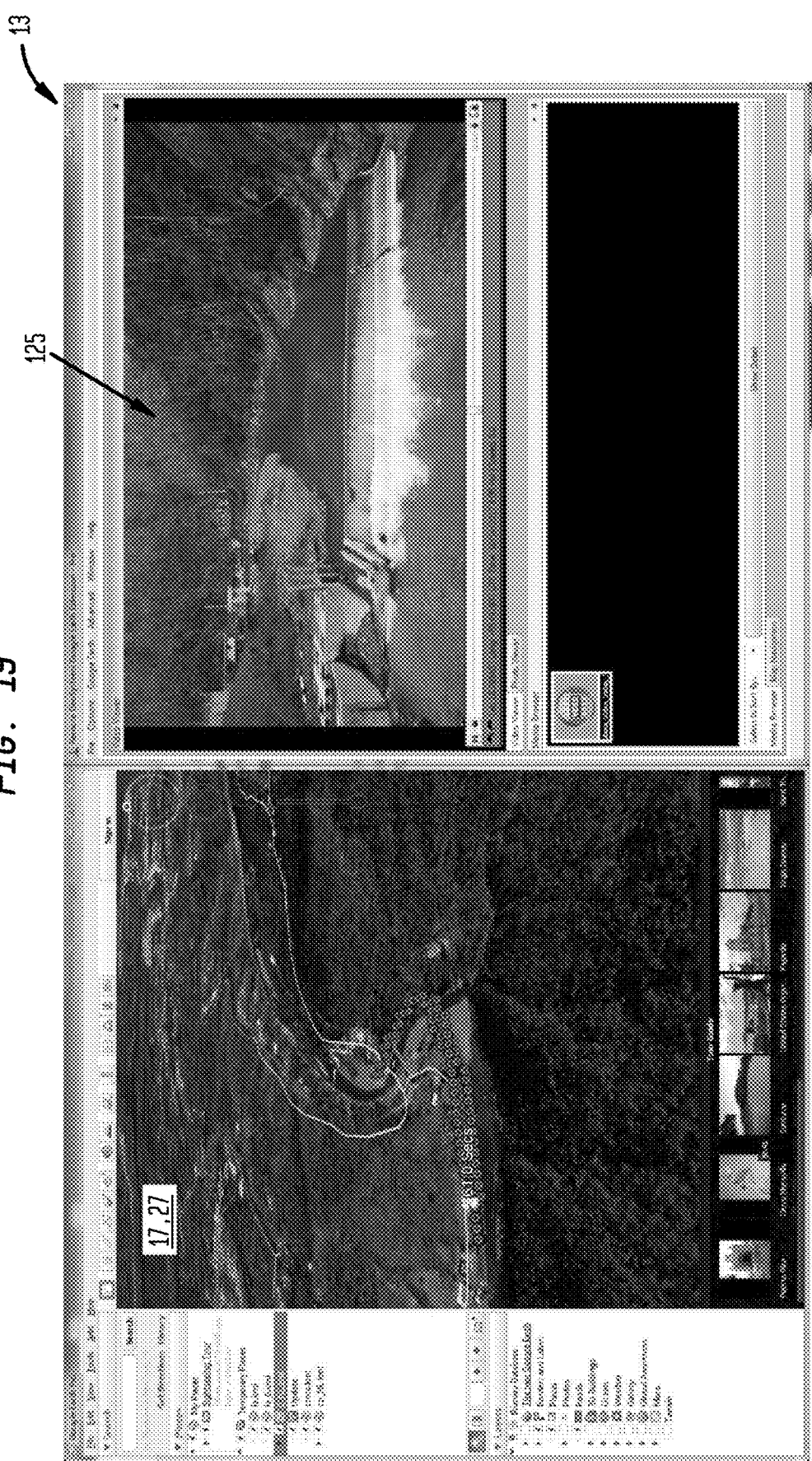

FIG. 19 is an illustration of a particular embodiment of a graphic user interface in which the coordinate location indicators can be disposed in any of a plurality of geospatial representations selected by the user.

Figure 20:
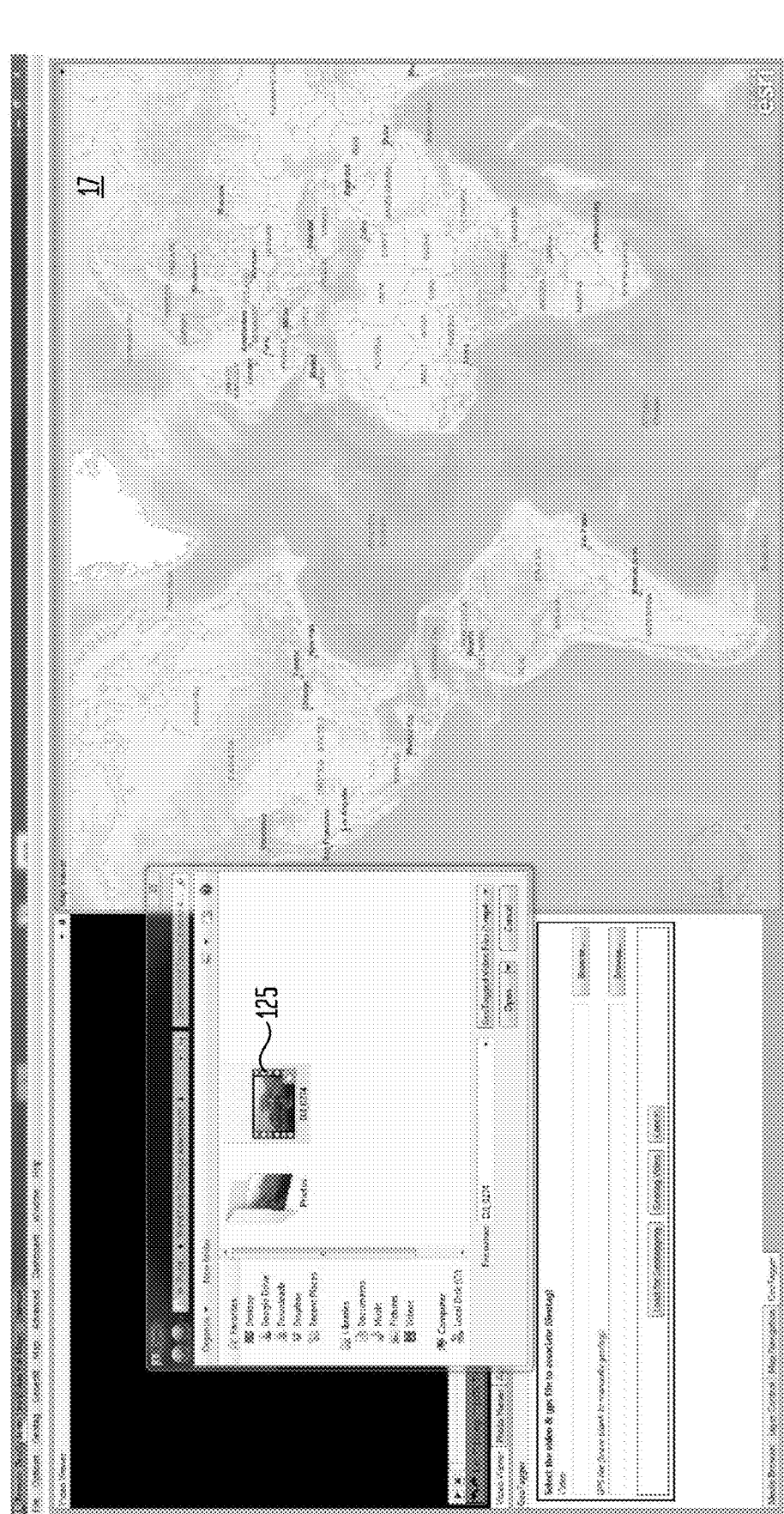

FIG. 20 is an illustration of a particular embodiment of a graphic user interface in which a user can select for retrieval a video for depiction in the graphical user interface on the display surface of a computing device.

Figure 21:
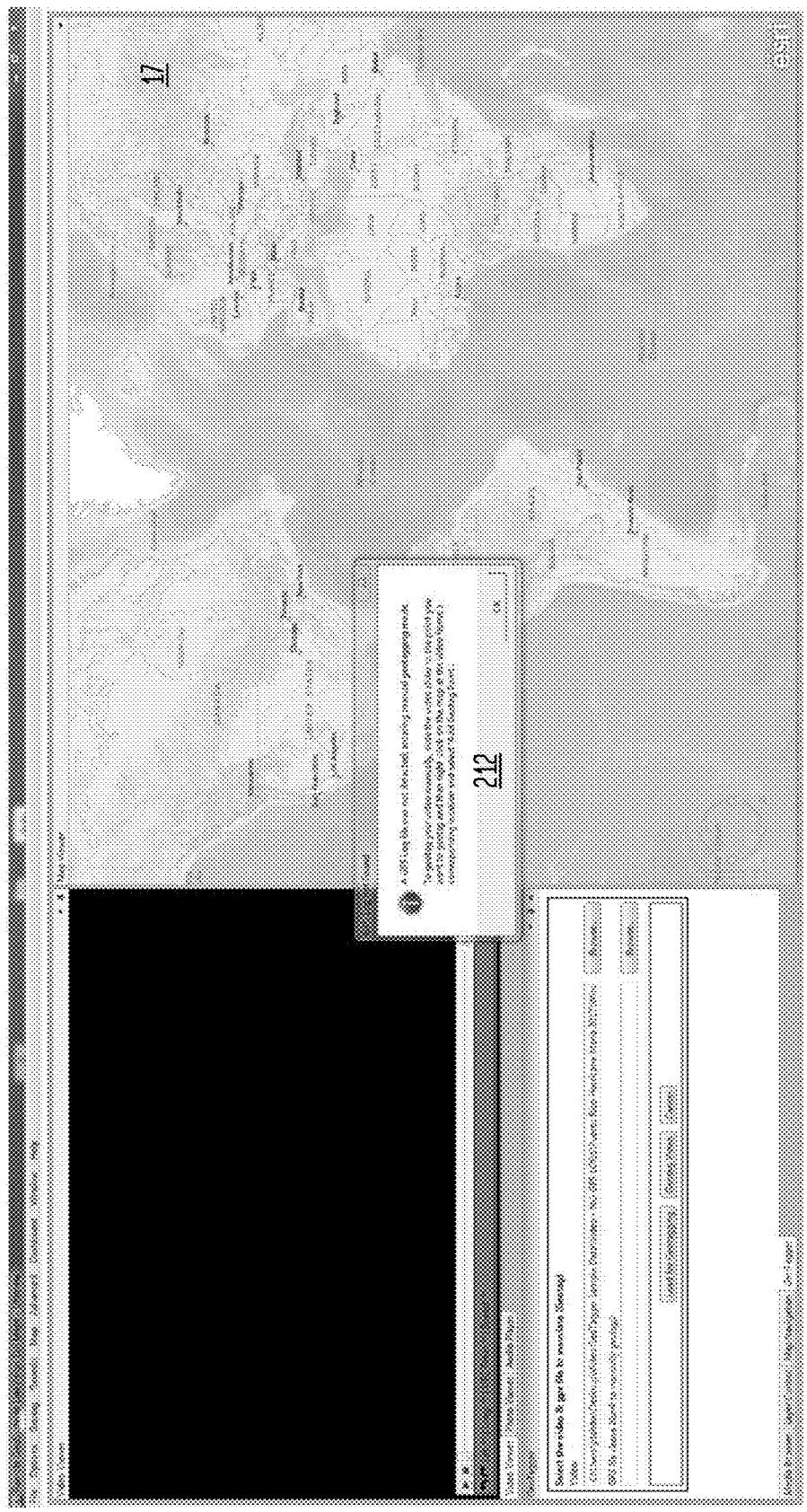

FIG. 21 is an illustration of a particular embodiment of a graphic user interface which depicts a notification block indicating that no global positioning data exists or can be retrieved to associate with the selected video.

Figure 22:
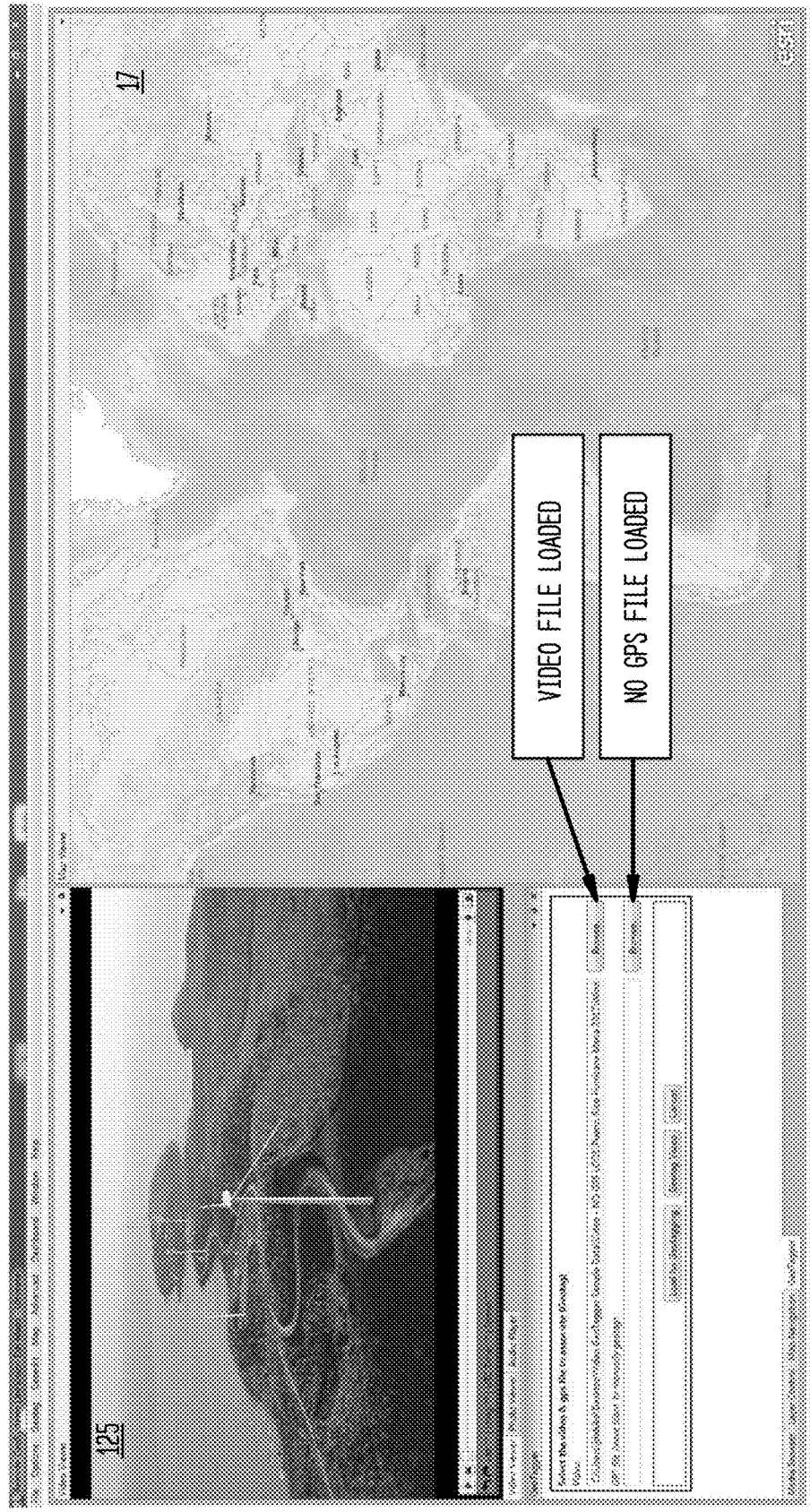

FIG. 22 is an illustration of a particular embodiment of a graphic user interface which depicts the selected video but no corresponding global positioning data exists.

Figure 23:
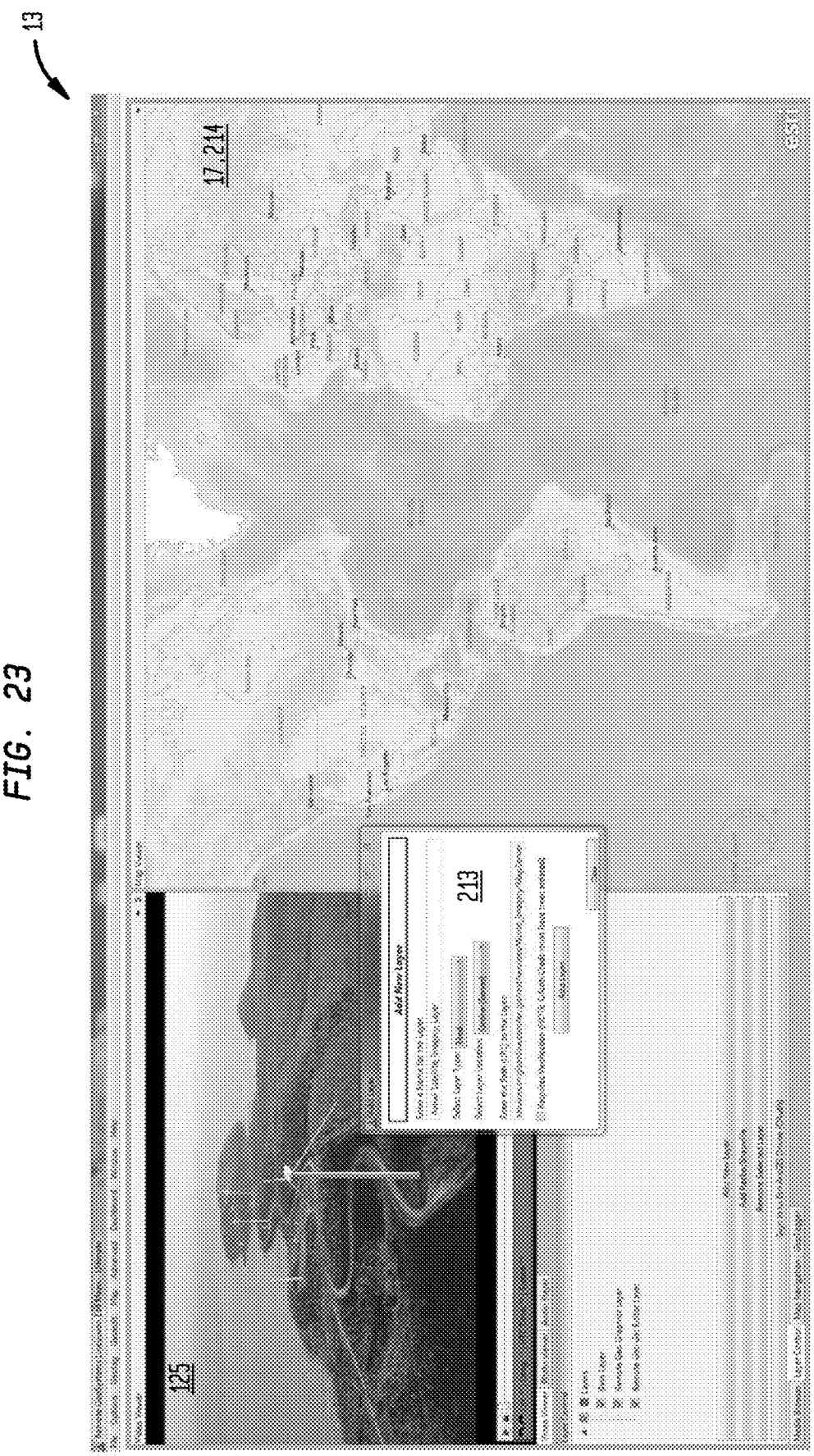

FIG. 23 is an illustration of a particular embodiment of a graphic user interface which depicts a geospatial representation selection element which by user indications allows selection of different geospatial representations for depiction in a coordinate encoded space.

Figure 24:
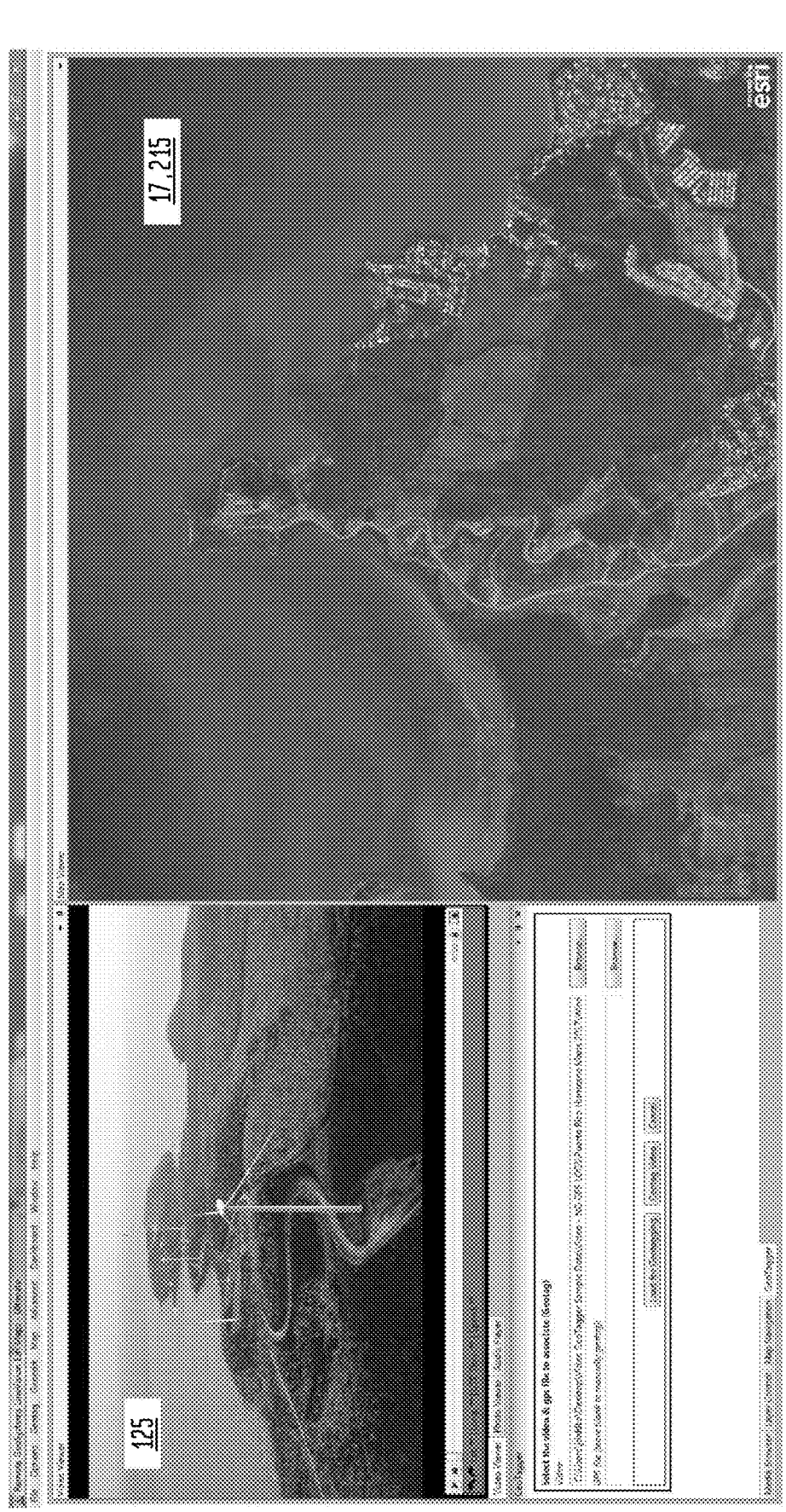

FIG. 24 is an illustration of a particular embodiment of a graphic user interface which depicts the selected geospatial representation.

Figure 25:
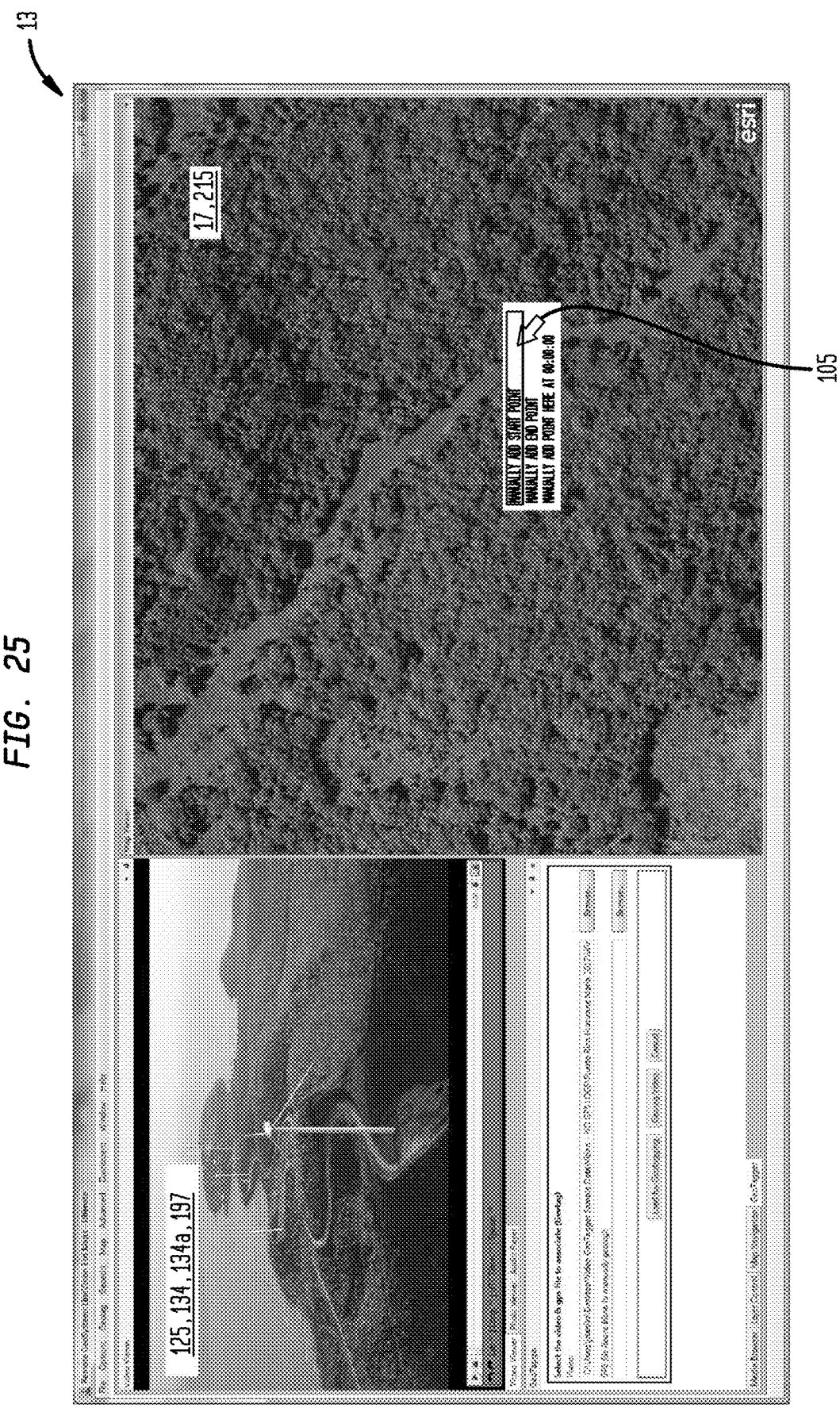

FIG. 25 is an illustration of a particular embodiment of a graphic user interface in which a user by indications in the geospatial representation can select first location coordinates (or beginning location coordinates) in the geospatial representation to correspondingly associate with a first video image (or a beginning video image) depicted in the graphical user interface.

Figure 26:
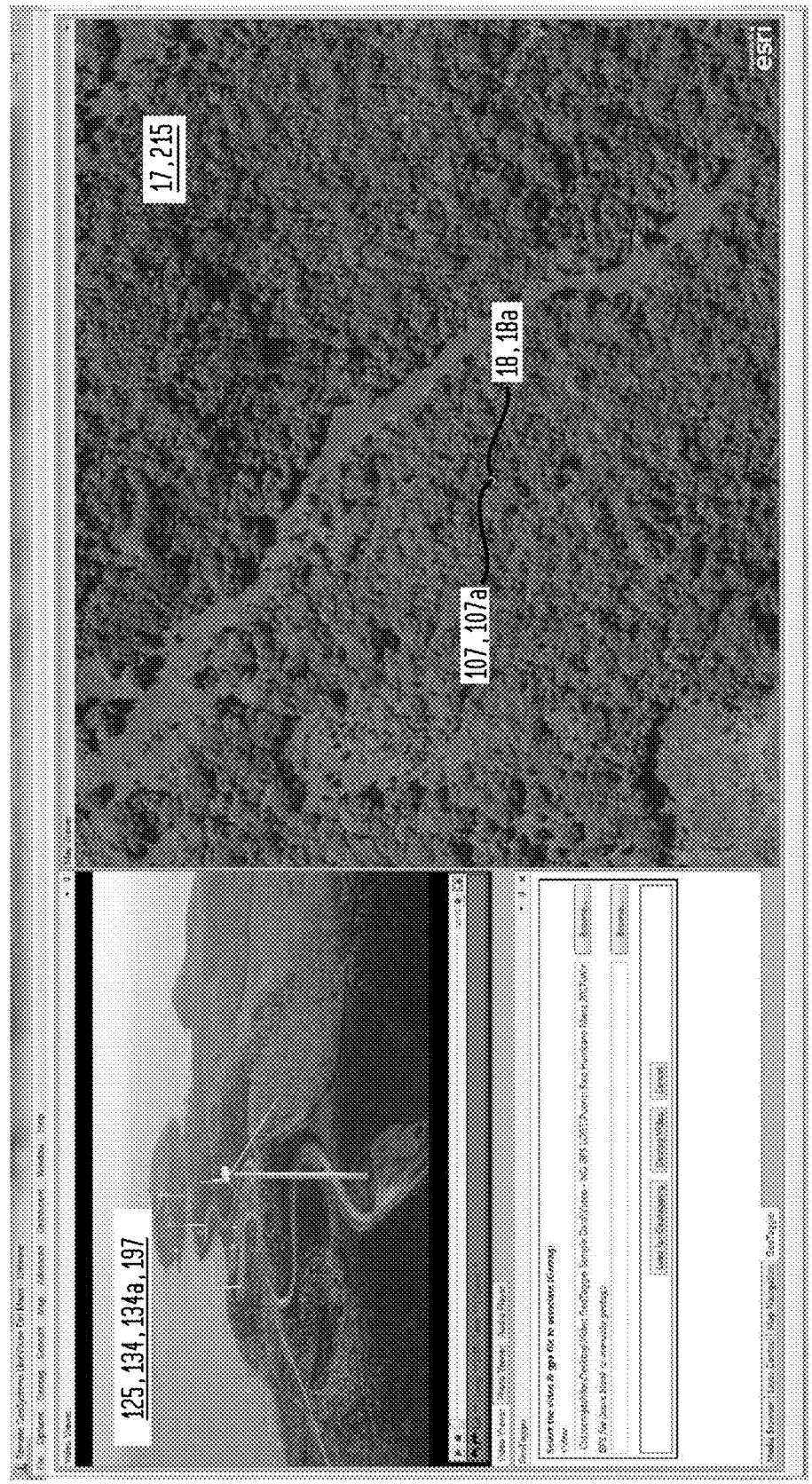

FIG. 26 is an illustration of a particular embodiment of a graphic user interface which depicts a first location coordinate indicator in the geospatial representation at the selected location coordinates associated with the first video image depicted in the graphical user interface.

Figure 27:

FIG. 27 is an illustration of a particular embodiment of a graphic user interface in which the user by indications in the geospatial representation can select second location coordinates in said geospatial representation to correspondingly associate with a second video image depicted in the graphical user interface.

Figure 28:

FIG. 28 is an illustration of a particular embodiment of a graphic user interface which depicts a second location coordinate indicator in the geospatial representation at the selected location coordinates associated with the second video image depicted in the graphical user interface.

Figure 29:
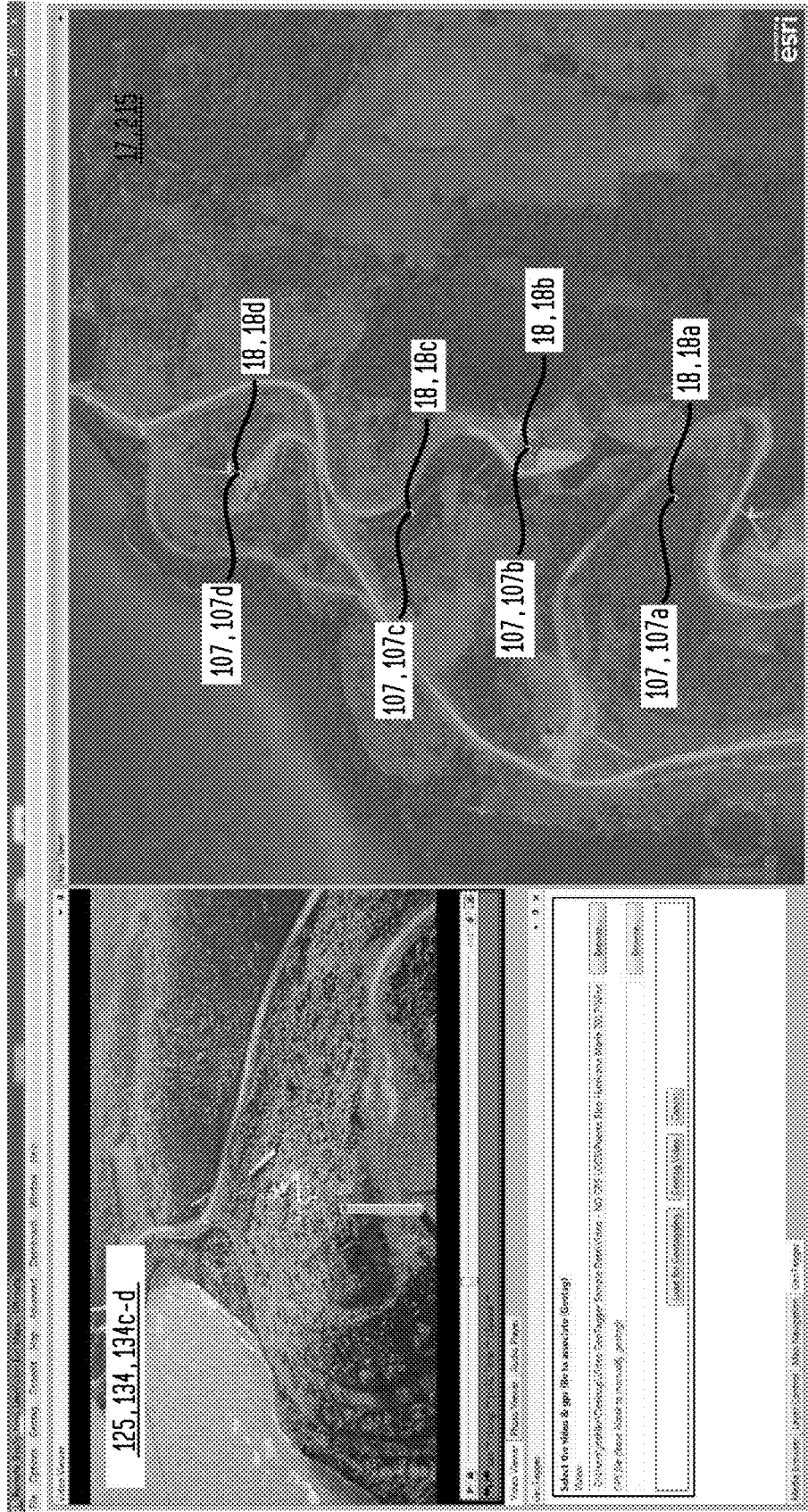

FIG. 29 is an illustration of a particular embodiment of a graphic user interface in which a user by indications in the geospatial representation can select a third or more location coordinates in the geospatial representation to correspondingly associate with a third or more video images depicted in the graphical user interface.

Figure 30:
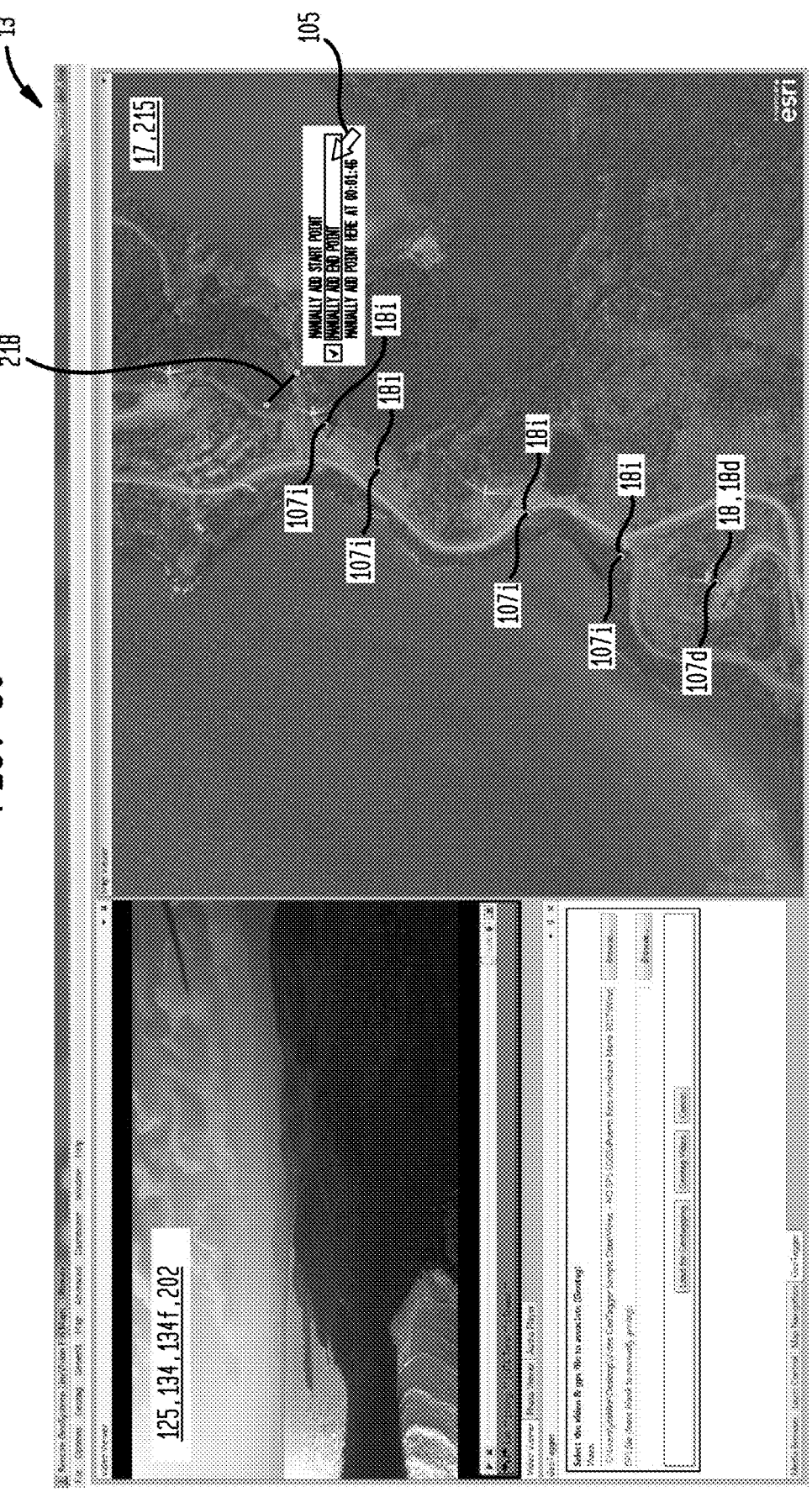

FIG. 30 is an illustration of a particular embodiment of a graphic user interface in which a user by indications in the geospatial representation can select final location coordinates (or end location coordinates) in the geospatial representation to correspondingly associate with a final video image (or an ending video image) depicted in the graphical user interface.

Figure 31:
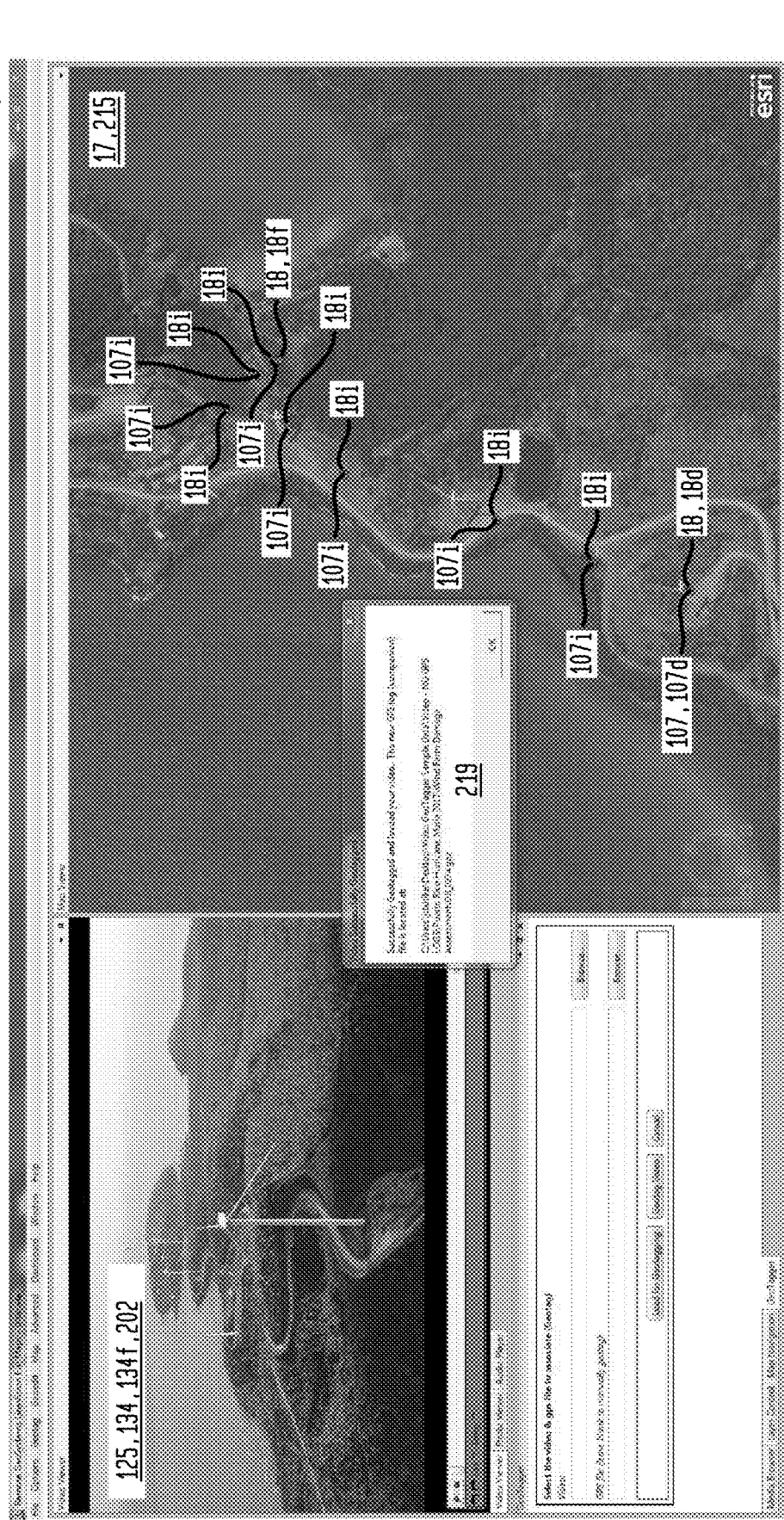

FIG. 31 is an illustration of a particular embodiment of a graphic user interface in which a synchronization completion message block indicating that all the selected location coordinates have been associated with the selected video images depicted in the graphical user interface.

Figure 32:
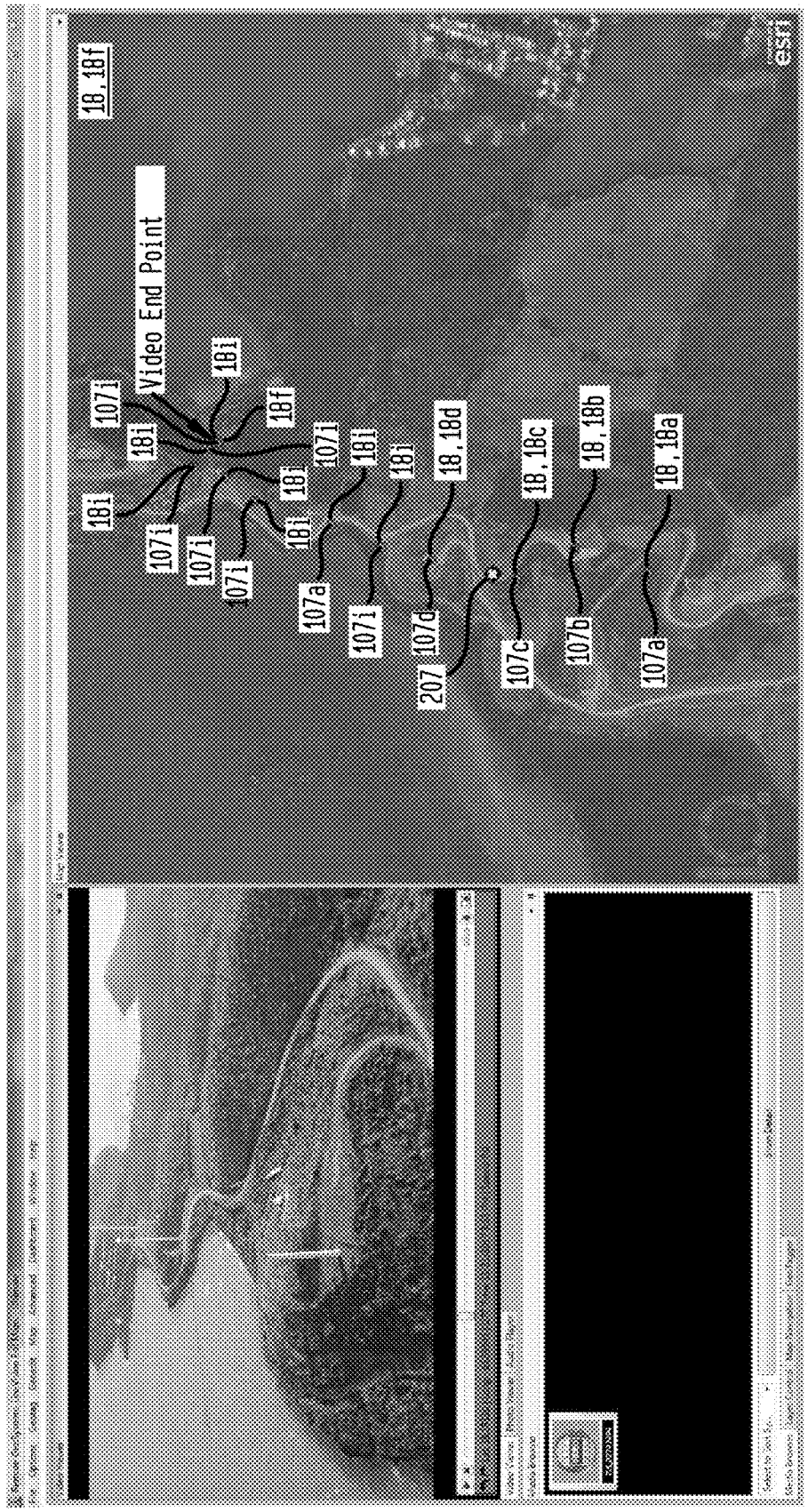
Figure 33:
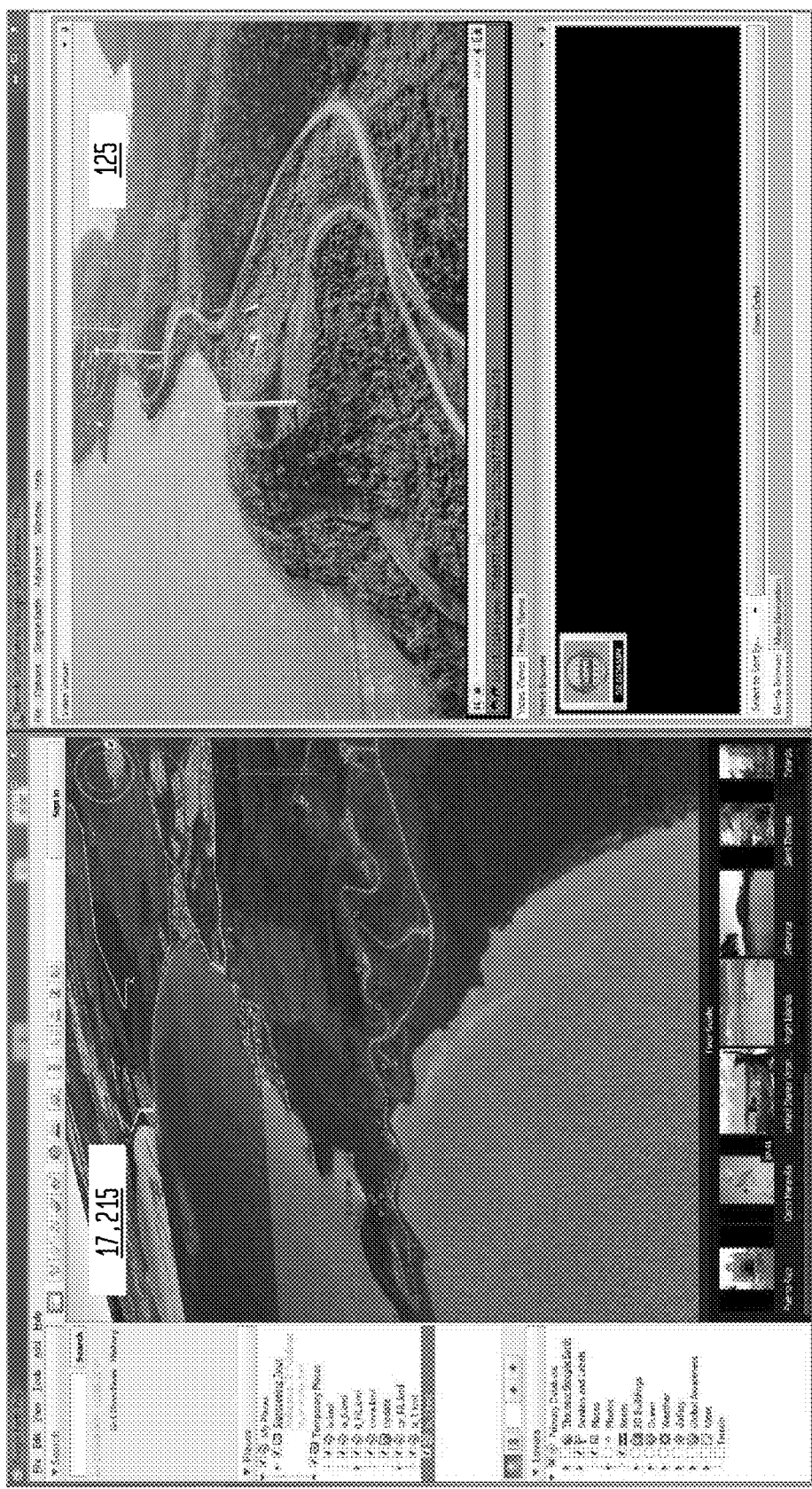

FIG. 32 is an illustration of a particular embodiment of a graphic user interface in which additional location coordinates have been interpolated based upon prior selected location coordinates FIG. 33 is an illustration of a particular embodiment of a graphic user interface in which the geospatial representation can be changed while retaining the location coordinate indicators in a geospatial representation.

V. DETAILED DESCRIPTION OF THE INVENTION

Figure 1:
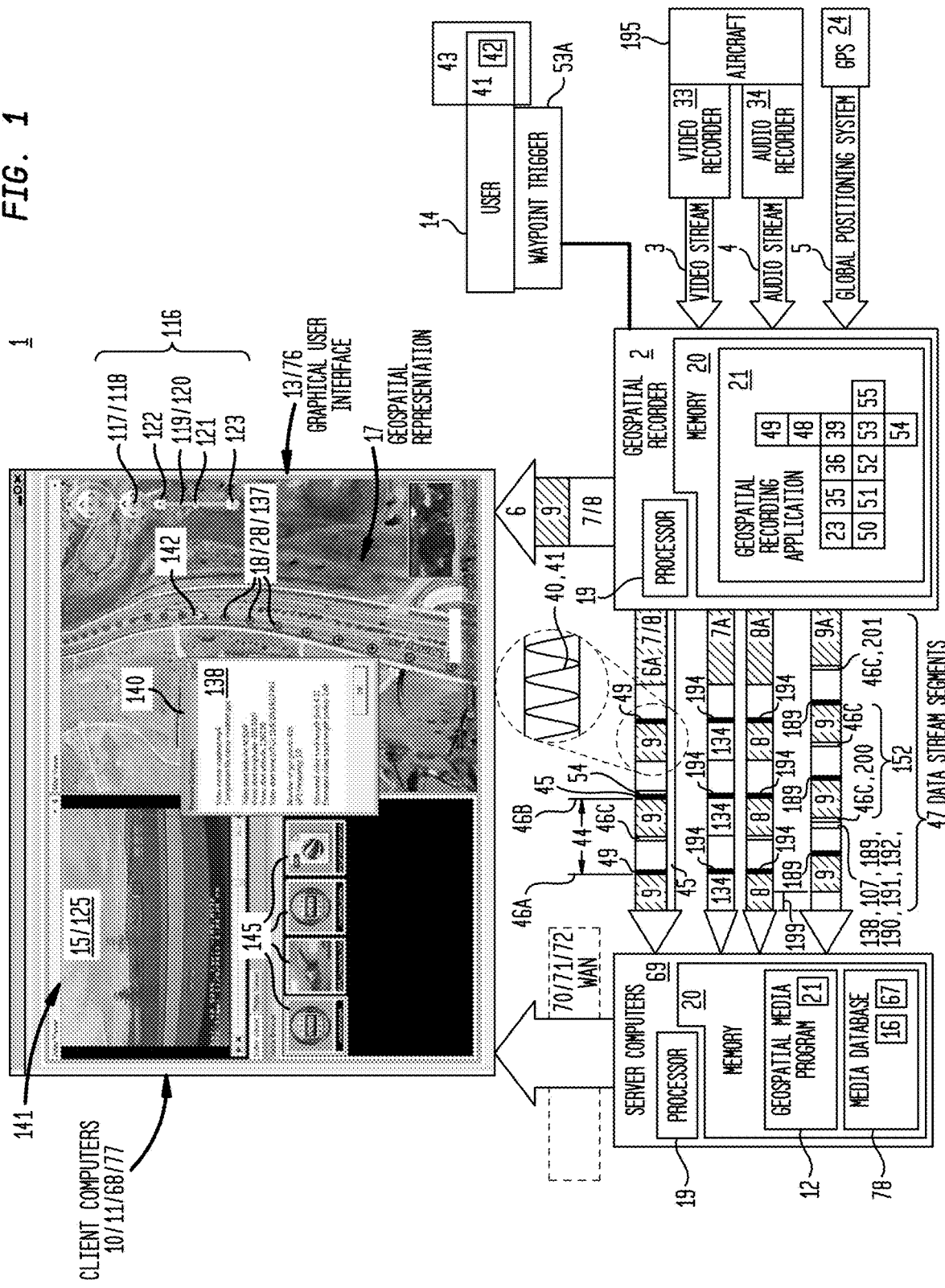
FIG. 1 is a block diagram of a particular embodiment of a geospatial recorder operable in an embodiment of a geospatial media recording system.

Now referring primarily to FIG. 1, which provides general overview of a geospatial media recording system (1). The geospatial recorder (2) can operate discretely to acquire and encode a video stream (3), an audio stream (4) and global positioning signal (5) generating a combined data stream (6) including video stream data (7) and audio stream data (8), either or both of which, are continuously embedded at intervals with global positioning data (9). The geospatial recorder (2), as part of the geospatial media recording system (1), can be connected to a computer network (10) which can include one or a plurality of nodes (11) each containing or having access to a geospatial media program (12) which implements a graphical user interface (13) interactive with a user (14) to display a video image (15) corresponding to the video stream data (7) (whether during acquisition by the geospatial recorder (2) or by retrieving a media file (16)) and to concurrently display a geospatial representation (17) in which one or a plurality of coordinate location indicators (18) can be generated based on extraction of the global positioning data (9) embedded in the video steam data (7) or audio stream data (8).

Embodiments of the geospatial media recording system (1) are described in the general context of a processor (19) in communication with a memory element (20) which contains the geospatial media program (12) providing a computer readable media which includes computer-executable instructions such as an application program or program modules which utilize routines, programs, objects, components, data structures, or the like, executable by the processor (19) to perform particular functions or tasks or implement particular abstract data types, or the like; however, it is not intended that embodiments of the geospatial media program (12) be limited to a particular computer code, set of computer-executable instructions or protocols.

The Geospatial Recorder.

Figure 2:
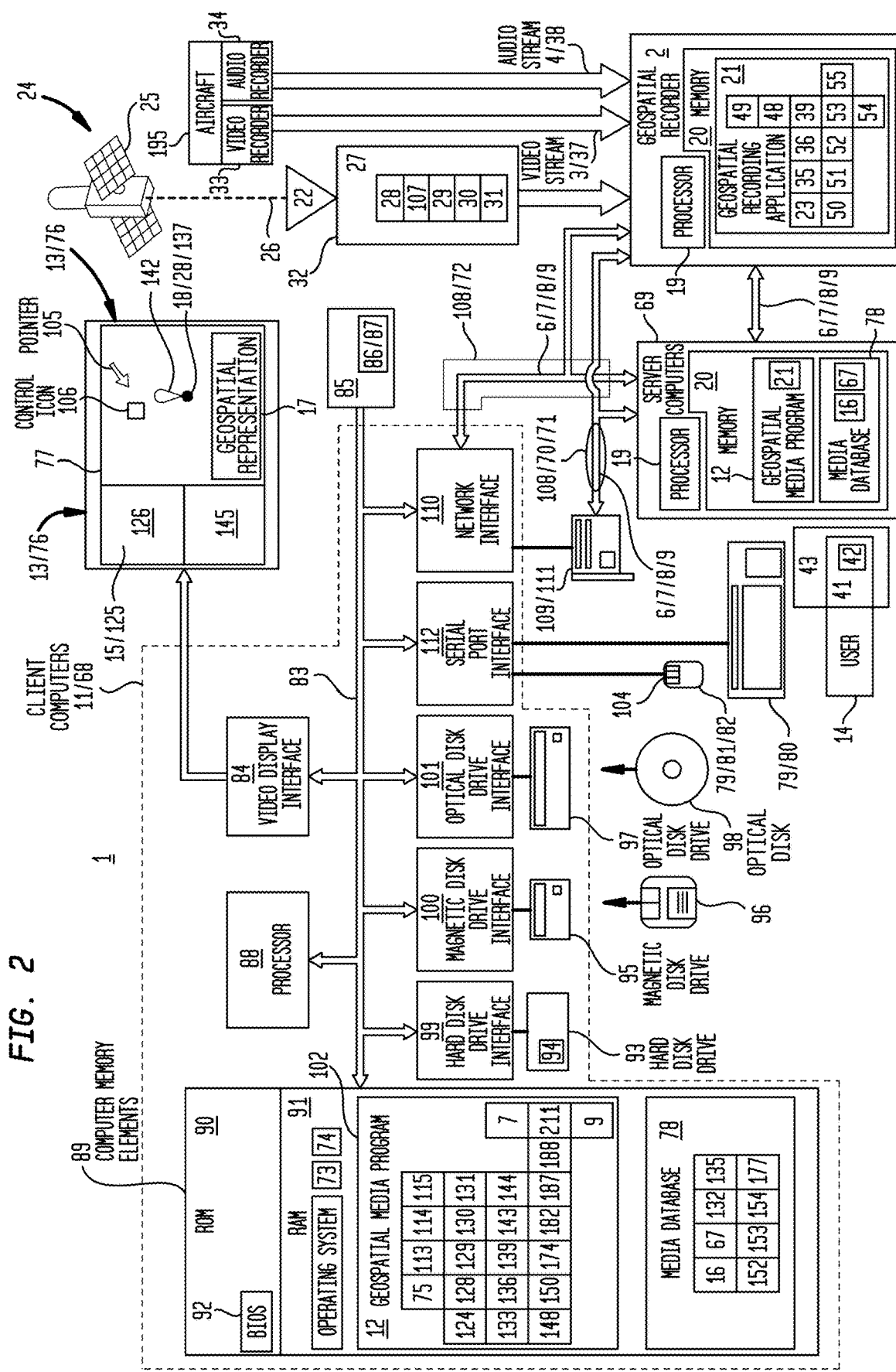
FIG. 2 is a block diagram of an illustrative computer means, network means and computer-readable medium which provides computer-executable instructions to provide an embodiment of the geospatial recorder and geospatial media recording system.

Now referring primarily to FIGS. 1 and 2, the geospatial recorder (2) includes or has access to a processor (19) in communication with a memory element (20) containing or having access to a geospatial recording application (21), which can be discrete from or a part of the geospatial media program (12). The geospatial recording application (21) includes a global positioning signal receiver module (23) capable upon execution of receiving and decoding the global positioning signal (5) generated by a global positioning system (24). The term "global positioning system (24)", for the purposes of this invention, means a plurality of earth-orbiting satellites (25) each transmitting a satellite positioning signal (26) continuously towards the Earth (27), that enables a coordinate location (28) (based on establishing location coordinates (107) including one or more of a longitude (29), a latitude (30) and an altitude (31)(respectively X, Y, Z)) of a global positioning signal receiver (22) on or near the Earth's surface (32) to be accurately estimated from the difference in arrival times of the satellite positioning signals (26) from the plurality of earth-orbiting satellites (25). The accuracy of the coordinate location (28) depending upon the number of satellite positioning signals (26) locked onto in determining the coordinate location (28). For example, to provide a coordinate location (28) with an accurate three-dimensional location (X, Y, Z), four satellite positioning signals (26) must be locked onto while a coordinate location (28) limited to a longitude (29) and a latitude (30) (X, Y) can be gained by locking onto two or three satellite positioning signals (26).

The geospatial recorder (2) can further include a video recorder (33) or an audio recorder (34)(or both). The geospatial recording application (21) can further include a video receiver module (35) which upon execution receives the video stream (3) from the video recorder (33) and an audio receiver module (36) which upon execution receives the audio stream (4) from the audio recorder (34). The term "video stream (3)" for the purposes of this invention, means one or more channels of video signal (37) being transmitted, whether streaming or not streaming, analog or digital. The term "audio stream (4)" for the purposes of this invention, means one or more channels of audio signal (38) being transmitted, whether streaming or not streaming, analog or digital. The term "video recorder (33)" for the purposes of this invention, means any device capable of recording one or more video streams (3). Examples of a video recorder include, but are not necessarily limited to, a video camera, a video surveillance recorder, a computer containing a video capture card, mobile phones having video recording capabilities, or the like. The term "audio recorder (34)" for the purposes of this invention, means any device capable of recording one or more audio streams (4). Examples of an audio recorder (34) include, but are not necessarily limited to, a video camera having audio recording capabilities, mobile phones, a device containing a mic-in input, a device having a line-in input, a computer containing an audio capture card, or the like.

The geospatial recording application (21) can further include an encoder module (39) which upon execution encodes the global positioning system signal (5) as global positioning data (9)(shown in the example of FIG. 1 as arrow 9A, the video stream (3) as video stream data (7) (shown in the example of FIG. 1 as arrow 7A), and the audio stream (4) as audio stream data (8)(shown in the example of FIG. 1 as arrow 8A).

In particular embodiments, the encoder module (39) upon execution further functions to embed the global positioning data (9) in the video stream data (7) or the audio stream data (8)(show in the example of FIG. 1 as arrow 6A). The encoder module (39) further functions upon execution to generate the combined data stream (6) containing the video stream data (7) and the audio stream data (8) one or both embedded with the global positioning data (9). The encoded audio stream data (8) or video stream data (7) can be assembled in a container bit stream such as MP4, FLV, WebM, ASF, ISMA, MOV, AVI, or the like.

In particular embodiments, the encoder module (39) can embed the global positioning data (9) in the audio stream data (8) at an embedding frequency (40) at about an upper end of a human audible range (41) or outside the human audible range (41) in Hertz. The embedding frequency (40) can occur at between about 15,000 Hz to about 23,000 Hz. As to particular embodiments, one or more embedding frequencies (41) can be pre-selected to reduce or substantially eliminate human audible sound (42) during reproduction of sound (43) associated with the audio stream data (8). One or more embedding frequencies (41) can be selected from the group comprising or consisting of: about 15,500 Hz to about 16,000 Hz, about 15,750 Hz to about 16,250 Hz, about 16,000 Hz to about 16,500 Hz, about 16,250 Hz to about 16,750 Hz, about 16,500 Hz to about 17,000 Hz, about 16,750 Hz to about 17,250 Hz, about 17,000 Hz to about 17,500 Hz, about 17,250 Hz to about 17,750 Hz, about 17,500 Hz to about 18,000 Hz, about 17,750 Hz to about 18,250 Hz, about 18,000 Hz to about 18,500 Hz, about 18,250 Hz to about 18,750 Hz, about 18,500 Hz to about 19,000 Hz, about 18,750 Hz to about 19,250 HZ, about 19,000 Hz to about 19,500 Hz, about 19,250 Hz to about 19,750 Hz, about 19,500 Hz to about 20,000 Hz, about 19,750 Hz to about 20,250 Hz, about 20,000 Hz to about 20,500 Hz, about 20,250 Hz to about 20,750 Hz, about 20,500 Hz to about 21,000 Hz, about 20,750 Hz to about 21,250 Hz, about 21,000 Hz to about 21,500 Hz, about 21,250 Hz to about 21,750 Hz, about 21,500 Hz to about 22,000 Hz, about 21,750 Hz to about 22,250 Hz, about 22,000 Hz to about 22,500 Hz, and about 22,250 Hz to about 22,750 Hz, and combinations thereof.

The encoder module (39) upon execution can further function to continuously embed the global positioning data (9) at intervals in the audio stream data (8). The interval frequency (44) for embedding global positioning data (9) in the audio stream data (8) can be selected in the range of between about 1 Hz to about 5 Hz; however, a greater range can be utilized depending upon the application. For example, up to 100 Hz or even greater as improvements in the technology occur. As to particular embodiments, the interval frequency (44) can be between about 1 Hz or 5 Hz; although the interval frequency (44) can be selected from one or more of the group comprising or consisting of: about 1 Hz to about 2 Hz, about 1.5 Hz to about 2.5 Hz, about 2 Hz to about 3 Hz, about 2.5 Hz to about 3.5 Hz, about 3 Hz to about 4 Hz, about 3.5 Hz to about 4.5 Hz, and about 4.0 to about 5 Hz, or similarly incrementally selected throughout a wider range up to 100 Hz.

As to particular embodiments, the encoder module (39) upon execution can embed the global positioning data (9) in the video stream data (7). The global positioning data (9) can be embedded as a text overlay element (45) (for example, a closed captioning element) of the video stream data (7). The global positioning data (9) can be continuously embedded at intervals in the text overlay (45) of the video stream data (7) with an interval frequency (44) which is the same or similar to that utilized in embedding global positioning data (9) in the audio stream data (8), as above described.

With respect to embedding global positioning data (9), whether in the audio stream data (8) or the video stream data (7), the embedding can occur continuously at the selected frequency interval (44) for the entire duration of, or between a pair of data end points (46A) (46B) selected within the video stream data (7) or the audio stream data (8). The combined data stream (6) continuously embedded with the global position data (9) allows a data stream point (46C) or data stream segments (47) to be isolated or excised from the combined data stream (6) without loss or having a reduced loss of the global positioning data (9) associated with the data stream point (46) or data stream segment (47).

The geospatial recording application (21) can further include a time code module (48) which upon execution functions to associate current date and time data (49) with the global positioning data (9) embedded in the audio stream data (8) or the video stream data (7) of the combined data stream (6).

The geospatial recording application (21) can further include a codec module (50) which functions to compress the combined data stream (9) including the global positioning data (9) embedded in the audio stream data (8) or the video stream data (7) of the combined data stream (6). The audio stream data (8) can be compressed using an audio codec (51) such as MP3, Vorbis, AAC, or the like. The video stream data (7) can be compressed using a video codec (52) such as H.264, VP8, or the like. The compressed combined data stream (6) embedded with the global positioning data (9) can be retrievably stored in the memory element (20) whether internal to the geospatial recorder (2) or in a computer network node (11) accessible by the geospatial recorder (2).

In a particular embodiment of the geospatial recorder (2), the geospatial recording application (21) can further include a waypoint input module (53) which upon execution can communicate with the global positioning system receiver module (23) and the video receiver module (35) to generate a waypoint (54) (also referred to as a "bookmark") at a data stream point (46C) associated with or at the activation time of the waypoint input module (53). The waypoint input module (53) can be activated by user interaction with a waypoint trigger (53A)(as illustrative examples, manual closure of a switch, keyboard stroke, mouse click, or the like). The waypoint input module (53) can further communicate with the time code module (48) to associate a current date and time data (49) with the waypoint (54). The geospatial recording application (21) can further include a video image extraction module (55) activated by execution of the waypoint input module (53) to extract a video image (15) and the corresponding embedded global positioning data (9) from the audio stream data (8) or the video stream data (7) of said combined data stream (6) at the waypoint (54) along with the associated current date and time data (49) for retrievable storage in the memory element (20) as a companion file (67).

The Geospatial Media Recording System.

Again, referring primarily to FIGS. 1 and 2, the geospatial recorder (2) can be connected to one or a plurality of nodes (11) including one or more client computers (68) or server computers (69) through a wide area network (70) ("WAN"), such as the Internet (71), or one or more local area networks (72) ("LAN"). As to particular embodiments, the one or more client computers (68) can take the form of a limited-capability computer designed specifically for navigation on the World Wide Web of the Internet (71). Alternatively, the one or more client computers (68) might be set-top boxes, intelligent televisions connected to receive data through an entertainment medium such as a cable television network or a digital satellite broadcast, hand-held devices such as smart phones, slate or pad computers, personal digital assistants or camera/cell phone, or multiprocessor systems, microprocessor-based or programmable consumer electronics, network PCs, minicomputers, mainframe computers, or the like.

Again, referring primarily to FIGS. 1 and 2, each of the one or more client computers (68) can include an Internet browser (73) such as Microsoft's INTERNET EXPLORER®, GOOGLE CHROME®, MOZILLA FIREFOX®, or the like, which functions to download and render multimedia content that is formatted in "hypertext markup language" (HTML). In this environment, a server computer (69) might be programmed to implement the most significant portions of a graphical user interface (13). As to these embodiments, the geospatial media program (12) can further include a graphical user interface module (75) which implements the graphical user interface (13). The graphical user interface module (75) can be resident in the server computer (69) (as shown in the example of FIG. 1) and the one or more client computers (68) can use the Internet browser (73) to simply display downloaded content and to relay user inputs back to the server computer (69). The server computer (69) would respond by formatting screen displays (76) (as shown in the illustrative examples of FIGS. 3 through 9) and downloading the screen displays (76) for display on a display surface (77) associated with a client computer (68).

In other embodiments, the server computer (69) can be used primarily as a media database (78) for retrievable storage of media files (16), with primary responsibility for implementing the graphical user interface (13) being placed upon each of the client computer (68)(as shown in the example FIG. 2). As to these embodiments, each of the client computers (68) can execute the graphical user interface module (75) implementing the graphical user interface (13) to format screen displays (76) and to retrieve media files (16)

from the server computer (69) media database (78). While illustrative examples in this description attribute storage and retrieval of data to one server computer (69) for clarity, it is to be understood that various types of data may reside in one server computer (69) or one type of data can be distributed among a plurality of server computers (69). Embodiments of the invention can utilize server computers (69) to a lesser or greater number or extent depending upon the application. The geospatial media program (12) can upon execution can provide media files (16) and other data obtained from the server computer (69) in a common format.

A user (14) can enter commands and information into one or more client computers (68) through input devices (79) such as a keyboard (80) or a pointing device (81) such as a mouse (82); however, any method or device that converts user (14) action into commands and information can be utilized including, but not limited to: a microphone, joystick, game pad, touch screen, or the like. A display surface (77) such as a monitor screen or other type of display device can also be connected to a bus (83) via a video display interface (84), such as a video adapter, or the like. The graphical user interface (13) can in part be presented as an interactive graphic user interface (13) on the display surface (77). In addition to the display surface (77), each of the one or more client computers (68) can further include other peripheral output devices (85) such as speakers (86) and printers (87); although the peripheral output devices (85) are not so limited.

Now referring primarily to FIG. 2, as a non-limiting example, a client computer (68) can provide a computer processor (88), a computer memory element (89), and a bus (83) which operably couples components of the client computer (68), including without limitation the computer memory elements (89) to the computer processor (88). The computer processor (88) can comprise one central-processing unit (CPU), or a plurality of processing units which operate in parallel to process digital information. The bus (83) may be any of several types of bus configurations including a memory bus or memory controller, a peripheral bus, and a local bus using any of a variety of bus architectures. The computer memory element (89) can without limitation be a read only memory (ROM) (90) or a random-access memory (RAM) (91), or both. A basic input/output system (BIOS) (92), containing routines that assist transfer of data between the components of the client computer (68), such as during start-up, can be stored in ROM (90). The client computer (68) can further include a hard disk drive (93) for reading from and writing to a hard disk (94), a magnetic disk drive (95) for reading from or writing to a removable magnetic disk (96), and an optical disk drive (97) for reading from or writing to a removable optical disk (98) such as a CD ROM or other optical media. The hard disk drive (93), magnetic disk drive (95), and optical disk drive (97) can be connected to the bus (83) by a hard disk drive interface (99), a magnetic disk drive interface (100), and an optical disk drive interface (101), respectively. The drives and their associated computer-readable media provide nonvolatile storage of computer-readable instructions, data structures, program modules and other data for the client computer (68). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules (102) may be stored on or included in the hard disk drive (93), magnetic disk (96), optical disk (98), ROM (90), or RAM (91), including an operating system (103), one or a plurality of application programs and in particular the geospatial media program (12).

A "click event" occurs when the user (14) operates a program, application, module, or code function through the use of a command which for example can include pressing or releasing the left mouse button (104) while a pointer (105) is located over a control icon (106)(or other interactive field which activates a function) displayed in the graphical user interface (13). However, it is not intended that a "click event" be limited to the press and release of the left button (104) on a mouse (82) while a pointer (105) is located over a control icon (106), rather, a "click event" is intend to broadly encompass a command by the user (14) through which a function of a program, application, module, or code can be activated or performed, whether through selection of one or a plurality of control icon(s) (106) or fields, or by user voice command, keyboard stroke, mouse button, touch on a touch screen, or otherwise. It is further intended that control icons (106) can be configured or displayed without limitation as a bullets, point, a circle, a triangle, a square, a polygon (or other geometric configurations or combinations or permutations thereof), or as fields or boundary elements created in displayed images, or as fields in which locations, addresses, or other terms can be entered manually, such as: a street address, a zip code, a county code, a natural area code, a longitude (29)(also referred to as "X"), a latitude (30) (also referred to as "Y"), an altitude (31) (also referred to as "Z"), location coordinates (107)(X and Y or Z or XYZ), or other notation, script, character, or the like.

The client computer (68) may operate in a networked environment using one or more logical connections (108) to connect to other nodes (11) such as the geospatial recorder (2) or a server computer (69). These logical connections (108) can be achieved by one or more communication devices (109) coupled to or a part of the client computer (68); however, the invention is not limited to a particular type of communications device (109). The server computer (69) can be another computer, a server, a router, a network personal computer, a client, a peer device or other common network node, and can include a part or all of the elements above-described relative to the client computer (68). The logical connections (108) depicted in FIG. 2 can include a LAN (72) or WAN (70). Such networking environments are commonplace and include for example: enterprise-wide computer networks, intranets, wireless networks, global satellite networks, cellular phone networks, the Internet (71), or the like.

When used in a LAN-networking environment, the client computer (68) can be connected to the LAN (72) through a network interface (110) or adapter, which is one type of communications device (109). When used in a WAN-networking environment, the client computer (68) typically includes a modem (111), a type of communications device (109), or other type of communications device for establishing communications over the WAN (70), such as the Internet (71) (as shown in the example of FIG. 1). The modem (111), which may be internal or external to the client computer (68), can be connected to the bus (83) via a serial port interface (112). In a networked environment, program modules depicted relative to the client computer (68), or portions thereof, may be as to certain embodiments of the invention be stored in the server computer (69) (as shown in the examples of FIGS. 1 and 2). It is appreciated that the network connections (109) shown are exemplary and other means of and communications devices for establishing a communications link between the nodes (11) can be used.

Again, referring primarily to FIGS. 1 and 2, the client computer (68) can encompass a single client computer (68) or can encompass a plurality of client computers (68) each of which can be operated by a user (14). The user (14), a person, a plurality of persons, a business entity, or otherwise, can execute the geospatial media program (12) including the user interface module (75) to display a graphical user interface (13) in which media files (16) retrieved from the server computer (69), or the combined data stream (6) received directly from the geospatial recorder (2), can be displayed in a common format on the display surface (77).

Now referring to FIGS. 3 through 16, an exemplary embodiment of a graphical user interface (13) generated by the graphical user interface module (75) is shown. The graphical user interface (13) can be implemented using various technologies and different devices, depending on the preferences of the designer and the particular efficiencies desired for a given circumstance. By click event, the user (14) can activate the graphical user interface module (75) which functions to display the graphical user interface (13) on a display surface (77) of the client computer (68).

The geospatial media program (12) further includes a geospatial representation module (113) which upon execution functions to retrieve and display a geospatial representation (17) of a coordinate encoded geographic space (114) (such as the Earth's surface (32)) on the display surface (77) of the client computer (68). The geographic representation (17) can take any viewable form having any number of dimensions, any manner of symmetry, geometric properties, whether finite or infinite, which can be adapted to allow selection of a coordinate location (28) having location coordinates (107)(X or Y or XY or XYZ) by execution of the geospatial media program (12), whether by utilizing a pointer (105) pointing to a coordinate location (28) in the geographic representation (17), or by entering location coordinates (107), selection from a drop down list of coordinate locations (28), key word search, photograph or data coordinate locations, photo captions, photo attribute data generated by a camera or other devices, or search criteria derived from all of the above, or the like attributable to the coordinate encoded geographic space (114). Typically, the geospatial representation (17) will be in the form of a graphical image, an aerial image, a satellite image, a thermal image, topography map, a geo-planar map, a photograph, whether in two or three dimensions. For example, the geospatial representation module (113) can access a server computer (69) which can serve, as examples: GOOGLE MAPS®, GOOGLE EARTH®, BING MAPS®, MAPQUEST®, ESRI ARCGIS®, PANORAMIO®, or the like.

In the example provided by FIG. 3, the geospatial representation module (113) retrieves from a server computer (69) a coordinate encoded geographic space (114), whether in whole or in part, which can be continuous or discontinuous, and decodes the coordinate encoded geographic space (114) to display the geospatial representation (17) on the display surface (77) of the client computer (68). The geographic representation (17) can be displayed as a three-dimensional image of a portion of the Earth's surface (32), including, at the displayed scale, roadways, manmade structures, or the like. As to particular embodiments, the geographic representation (17) can further display certain geographic and administrative boundaries such as such as states, counties, cities, towns or residential areas; however, it is not intended that embodiments of the geographic representation (17) necessarily include other than a graphical representation (17) including a coordinate encoded geographic space (115) in which location coordinates (107)(X, Y or X, Y, Z) define a unique coordinate location (28) in the geospatial representation (17).

Now referring primarily to FIGS. 2 and 3, as to particular embodiments, the geospatial media program (12) can further include a navigation module (115) which upon execution can display a navigation controller (116) on the display surface (77) of the client computer (68). The geographical representation (17) displayed on the display surface can be operably coupled to the navigation controller (116) to allow the geographic representation (17) to be directionally moved on the display surface (77) by user interaction with the navigation controller (116) (for example with a pan tool (117)) to display portions of the geographic representation (17) of the coordinate encoded geographic space (114) which at the displayed scale, lie outside of the geographic representation (17) displayed on the display surface (77). As to certain embodiments, the navigation controller (116) can be displayed in the form of arrows (118) correspondingly pointing in one or more cardinal directions (North, East, South, West). An arrow (118) by click event activates the navigation module (115) to move the view of the geographic representation (17) directionally on the display surface (77).

The navigation controller (116) can further include an image scale control (119). The geographic representation (17) can be operably coupled to image scale control (119) to allow the geographic representation (17) to be increased or decreased in scale on the display surface (77) (for example with a zoom tool (120)). As to certain embodiments, the image scale control (119) can be displayed on the display surface (77) in the form of a slider element (121) which can be dragged up or down to correspondingly increase or decrease the scale of the geographic representation (17) displayed on the display surface (77) and can further include a plus icon (122) or a minus icon (123) which by click event correspondingly increases or decreases scale of the geographic representation (17). However, these examples of directionally moving and altering scale of the geographic representation (17) are illustrative and other embodiments can allow the geographic representation (17) to be directionally moved or altered in scale by click event including one or more of key stroke, mouse drag, menu, toolbar, or the like.

Again referring primarily to FIGS. 3 and 4, the geospatial media program (12) can further include a media input module (124) which during acquisition of the video stream (3), the audio stream (4) and the global positioning signal (5) by the geospatial recorder (2), as above described, decodes the combined data stream (6) and either in a LAN (72) or a WAN (70) environment displays a video (125) on the display surface (77) of the client computer (68) currently with the geospatial representation (17) corresponding to the portion of the a coordinate encoded geographic space (114) associated with global positioning data (9) embedded in the audio stream data (8) or the video stream data (7)(as shown in the example of FIG. 3). A plurality of combined data streams (6) can each be decoded and each one can be concurrently displayed in a corresponding plurality of display surface areas (126) allowing the video (125) associated with each one of the plurality of combined data streams (6) to be concurrently viewed in corresponding one of the plurality of display surface areas (126). The media input module (124) can also function to provide a corresponding plurality of status indicators (127) correspondingly indicating the status of each of the plurality of combined data streams (6). The status indicators (127) can include location coordinates (107) (longitude (29) latitude (30), altitude (31), current date and time data (49) when the data stream was acquired the speed of the recorder(s) when the data stream was acquired, the satellite (25) strength of the global positioning data (9), or the like.

Each of the combined data streams (6) can be stored as media files (16) retaining the embedded global positioning data (9) in a server computer (69) media database (78) in the computer memory element (89). The media input module (124) can further function to retrieve from a server computer (69) or a client computer (68) a media file (16) retaining embedded global positioning data (9), as above described. The term "media file (16)" for the purposes of this invention means any type of file embedded with global positioning data (9) and without limiting the breadth of the foregoing can be an image file, a video file, document file, map files, shape files, extensible markup language file, keyhole markup language file, or the like.

Whether the media input module (124) functions during acquisition of the combined data stream (6) or functions to retrieve media files (16), the media input module (124) utilizes a plurality of different parsers (74) to read video data (7), audio data (8), and global positioning data (9) in the combined data stream (6) or from any file format or media type. Once the media input module (124) opens the media file (16) or receives the combined data stream (6), a global positioning data extraction module (128) functions to extract the global positioning data (9) from the combined data stream (6) or media file (16). The global positioning data extraction module (128) includes decoding applications which can be applied to the combined data stream (6) or media file (16) depending on the manner of embedding of the global positioning data (9) in the combined data stream (6) or media file (16). As an example, if the media file (16) comprises a video file (135) with the global positioning data (9) embedded in the audio stream (8), as above described, then an audio stream decoder (129) operates to decode the global positioning data (9). By way of a second example, if the media file (16) comprises a video file (135) with the global positioning data (9) embedded as a text overlay element (45), as above described, then an optical character recognition decoder (130) operates to decode the global positioning data (9).

The media input module (124) further functions to activate a view module (131) which functions to display the viewable content of the combined data stream (6) or the media file (16) on the display surface (77) of the client computer (68). For example, if the media file (16) comprises an image file (132) then the view module (131) activates an image viewer module (133) which functions to display an image (134) associated with the image file (132) on the display surface (77). As a second example, if the media file (16) comprises a video file (135) then the view module (131) activates a video viewer module (136) which functions to playback a video (125) associated with the video file (135) on the display surface (77) of the client computer (68). The media input module (124) along with the global positioning data extraction module (128) and view module (131) can concurrently open and concurrently display a plurality of combined data streams (6) or media files (16) on the display surface (77) of the client computer (68) along with the corresponding geospatial representation (17).

Now referring to FIG. 3, as to particular embodiments, as the combined data stream (6) is acquired, the media input module (124) can further function to generate and display one or a plurality of coordinate location indicators (18) in the geographic representation (17) based on the global positioning data (9) extracted by the global positioning data extraction module (128) from the combined data stream (6). Accordingly, as each video image (15) is displayed on the display surface (77) the global positioning data (9) can be extracted and converted to location coordinates (107) in the coordinate encoded geographic space (114) and a coordinate location indicator (18) can be displayed at the corresponding coordinate location (28) (for example X, Y or X, Y, Z) in the geographic representation (17). In the illustrative examples, coordinate location indicators (18) in the geospatial representations (17) are shown as dots, spots or circles; however, this is not intended to preclude any other manner of marks viewable in the geospatial representation (17) such as arrows or triangles (which may also indicate direction of movement), flags, bars, lines or interconnected lines. As above described, the global positioning data (9) can be embedded continuously at an interval frequency (44) in the audio stream data (8) or the video stream data (7) and correspondingly a plurality of coordinate location indicators (18) can be serially generated at intervals in the geographic representation (17) creating a video track (137) associated with the global positioning data (9) extracted at intervals from the audio stream data (8) or the video stream data (7).

Again, referring to FIG. 3, the media input module (124) can further function to associate metadata (138) with each coordinate location (28) or coordinate location indicator (18) displayed in the geographic representation (17) which allows subsequent retrieval of the media file(s) (16) associated with the metadata (138) associated with each coordinate location (28) or coordinate location indicator (18). The media input module (124) can further track pointer (105) movement in the geographic representation (17). A metadata viewer module (139) upon hover of the pointer (105) over a coordinate location indicator (18) can cause display of a metadata image (140) including metadata (138) in readable form relating to media files (16) associated with the hovered over coordinate location indicator (18). Upon click event of the coordinate location indicator (18) the media input module (124) can further function to retrieve and open the media file (16) associated with the selected coordinate location indicator (18) to display the associated media (141) on the display surface (77). For example, if the media file (16) associated with the coordinate location indicator (18) is an image file (132) the media input module (124) activates the image viewer module (136) which functions to display an image (134) associated with the image file (132) on the display surface (77). Likewise, if the media file (16) associated with the coordinate location indicator (18) is a video file (135) then the media input module (124) activates the video viewer module (136) which functions to open and play back the video (125) associated with the video file (136) on the display surface (77) of the client computer (68). As to particular embodiments, the media input module (124) can commence playback of the video commencing at the location coordinates (107) or the coordinate location (28) of the selected coordinate location indicator (18). For example, if the selected coordinate location indicator (18) in the geospatial representation (17) has location coordinates (107) associated with 47 seconds into the video (125), the video viewer module (136) commences playback of the video at 47 seconds into the video (125). As to particular embodiments, as the video (125) plays, the geospatial representation module (17) can function to display a current coordinate location indicator (142) over the coordinate location indicator (18) in the geospatial representation (17) indicating the coordinate location (28) associated with the instantly displayed portion of the video (125). As to particular embodiments, if the coordinate location (28) of the displayed portion of the video (125) falls outside of the portion of the geospatial representation (17) displayed on the display surface (77), the geospatial representation module (113) can move the geospatial representation (17) to locate the current coordinate location indicator (142) within onto the display surface (77).

Again, referring primarily to FIGS. 2 and 5, the geospatial media program (21) can further include a media browser module (143) which functions to maintain the media files (16) along with the associated global position data (9) and metadata (138) in persistent storage allowing the media database (16) by operation of a search module (144) to be searched through user (14) interaction in the graphical user interface (13). Because all the data in a media file (16) is georeferenced by location coordinates (107) (X, Y or X, Y, Z) and date and time elements (49) advanced searches can be performed using georeferenced search elements. As to particular embodiments, the media browser module (143) can further function to generate and display a media icon (145) on the display surface (77) of the client computer (68). As an illustrative example, the media file (16) can comprise a video file (135) and the media icon (145) can comprise a video image (15) extracted from the associated video file (135). A pointer (105) hovered above the video image (15)(or by other click event) can activate the media browser module (143) and the geospatial representation module (113) to generate a geospatial representation (17) based on the global positioning data (9) embedded in the video file (135) and can further generate and display one location coordinate indicator (18) or the plurality of location coordinate indicators (18) as a video track (137) in the geospatial representation (17), as above described. The current location coordinate indicator (142) corresponding to the global positioning data embedded in the video image (15) displayed as the media icon (145) can be further generated and displayed in the geospatial representation (17). Additionally, by click event in the media icon (145) the media browser module (143) can generate and display a list of media options (146) with each media option (147) (such as zoom, fit all media in geospatial representation, jump to time, remove item, view metadata image, or the like) selectable by click event.

Now referring primarily to FIGS. 2 and 6, the geospatial media program (21) can further include an image editor module (148). A video image (15) extracted from a video (125) or an image (134), whether or not previously embedded with global positioning data (9), can be displayed on the display surface (77) by operation of the image viewer module (133), as above described. By click event (such as, pointer (105) hover over or pointer click event in the image (15) (134)), the image editor module (148) can be activated to generate and display on the display surface (77) a global positioning data entry field (149) into which location coordinates (107) (X, Y, Z) can be entered by user (14) interaction to define a coordinate location (28) to associate with the image (134). As to particular embodiments, entry of location coordinates (107) into the global positioning data entry field (149) activates the geospatial representation module (113) to generate and display the geospatial representation (17) corresponding to the entered location coordinates (107).

As to particular embodiments, if the image (15) (134) was previously embedded with global positioning data (9) display of the image (135) can also activate the geospatial representation module (113) to generate and display the geospatial representation (17) corresponding to the embedded global positioning data (9), as above described. Subsequent entry of location coordinates (107) (X, Y, Z) into the global positioning data entry field (149) overwrites the embedded global positioning data (9) embedded in the image (134) to newly define location coordinates (107) (X, Y, Z) and the coordinate location (28) associated with the image (134). The image (134) and newly defined location coordinates (107) can be saved as an image file (132).

Now referring primarily to FIGS. 2 and 7, the geospatial media program (12) can further include a video editor module (150). A video (125), whether or not previously embedded with global positioning data (9), can be generated and displayed on the display surface (77) by operation of the video viewer module (136). By click event (such as, pointer (105) hover over or by pointer click event in the video (125)), the video editor module (150) can be activated to allow the video (125) to be edited in various ways.

Now referring primarily to FIGS. 6 and 7, the video editor module (150) can function to allow the user (14) to view and extract each one of the video images (15)(frame by frame) at any point in the video (125) without loss of, and including, the associated global positioning data (9) and metadata (138), associated with each video image (15). Once the video image (15) is extracted from the video (125), the resulting video image (15) can be passed to the image editor module (148) and edited, as above described.

Again referring primarily to FIG. 7, the video viewer module (136) upon execution opens a video file (135) and displays the video (125) on the display surface (77) and activates the geospatial representation module (113) which functions to display the geospatial representation (17) on the display surface including the plurality of location coordinate indicators (18) or the video track (137) corresponding to the global positioning data (9) embedded at intervals in the video stream data (7) or the audio stream data (8). The video editor module (150) can further function to generate video segments (151) of the video (125) retaining the corresponding embedded global positioning data segment (152) in the video segment (151).

Now referring primarily to FIG. 7, two illustrative examples of selecting a pair of data stream end points (46A)(46B) as a video segment start point (153) and a video segment end point (154) to define a video segment (151) of a video (125) are shown. In the first illustrative example, the video editor module (150) displays a video segment selector (155A) associated with the geospatial representation (17) displayed on the display surface (77). The video segment selector (155A) includes a video segment start point selection icon (156) which by click event functions to set the video segment start point (153) by click event on a first location coordinate indicator (157) in a video track (137). The video segment selector (155) further includes a video segment end point selection element (158) which functions to set the video segment end point (154) by click event on a second location coordinate indicator (159) in the video track (137). As to particular embodiments, the video editor module (150) can further function to identify the video segment (151) defined by the selected video segment start point (153) and the video segment end point (154) by visually observable alteration of the location coordinate indicators (18) inclusive of the video segment (151). As one illustrative example, the location coordinate indicators (18) inclusive of the video segment (151) can change color (160) in the geospatial representation (17).

In the second illustrative example, the video editor module (150) displays a video segment selector (155B) associated with the video (125) displayed on the display surface (77). The video segment selector (155B) includes a first video image selection slider (162A) operable to advance the video (125) video image (15) by video image (15) which by click event functions to set the video segment start point (153) associated with a first video image (163) displayed on the display surface (77). The video segment selector (155B) further includes a second video image selection slider (162B) operable to advance the video (125) video image (15) by video image (15) which by click event functions to set the video segment end point (154) associated with a second video image (164) displayed on the display surface (77). As to particular embodiments, the video editor module (150) can further function to identify the video segment (151) defined by the selected video segment start point (153) and the video segment end point (154) in the video track (137) displayed in geospatial representation (17). Again, the video segment can be identified by visually observable change of color (160) of the location coordinate indicators (18) in the geospatial representation (17) inclusive of video segment (151).

Now referring primarily to FIGS. 7, 8A and 8B, the video editor module (150) can further function to display a video segment editor (165) including a video segment removal icon (166) which by click event activates the video editor module (150) which functions to delete the selected video segment (151) from the video (125). The deletion of the selected video segment (151) also results in deletion of the corresponding coordinate location indicators (18) being removed from the geospatial representation (17) (as shown in the example of FIG. 8A as a line extending between selected first and second coordinate location indicators (157)(159)). The video editor module then functions to join the video segment start point (153) and the video segment end point (154)(splices the pair of data stream end points 46A and 46B) resulting in a continuous playback video (125) of shorter length and a geospatial representation (17) having the area corresponding to the deleted location coordinate indicators (18) removed (as shown in the example of FIG. 8B in which the selected first and second coordinate location indicators (157)(159) are drawn proximate each other).

The video editor module (150) can further function to display a video segment extraction icon (167) which by click event activates the video editor module (150) which functions to extract the selected video segment (151) from the video (125) along with the associated global positioning data (9). In the video (125), the extracted video segment (151) along with associated global positioning data (9) is deleted and the corresponding coordinate location indicators (18) are deleted from the geospatial representation (17)(as shown in the example of FIG. 8A). The extracted video segment (151) along with the associated global positioning data (9) is preserved and can be saved as media file (16). The video editor module then functions to join the video segment start point (153) and the video segment end point (154) (splices the pair of data stream end points 46A and 46B) resulting in a continuous playback video (125) of shorter length and a geospatial representation (17) having with the area corresponding to the deleted location coordinate indicators removed (as shown in the example of FIG. 8B).

The video editor module (150) can further function to display a video segment extract and advance icon (168) which by click event activates the video editor module (150) which functions to extract the selected video segment (151) from the video (125) along with the associated global positioning data (9). In the video (125), the extracted video segment (151) along with associated global positioning data (9) replaced with a blank insert of the same duration as the extracted video segment (151) to retain the original time duration of the video (125) and the corresponding coordinate location indicators (18) are deleted from the geospatial representation (17) and replaced with a blank insert (as shown in the example of FIG. 8A). The extracted video segment (151) along with the associated global positioning data (9) is preserved and can be saved as media file (16).

The video editor module (150) can further function to display a video segment copy icon (169) which by click event activates the video editor module (150) which functions to extract the selected video segment (151) from the video (125) along with the associated global positioning data (9). The original video (125) and global positioning data (9) remain unchanged. The video segment (151) and the corresponding global positioning data (9) can be saved as a discrete media file (16).

The video editor module (150) can further function to display a video segment insert icon (170) which by click event activates the video editor module (150) which functions to allow selection of the video segment start point (153) and the video segment end point (154). The video editor then functions to allow selection of a video segment (151) (or other video (125) or video image (15)) along with the associated global positioning data (9) and functions to insert the selected video segment (151)(125)(15) between the selected video segment start point (153) and the video segment end point (154). If the video segment start point (153) and the video segment end point (154) are selected at the same point the video editor functions to insert the selected video segment (151)(125)(15) at that point. The video editor module (150) further functions to insert the corresponding coordinate location indicators (18) into the geospatial representation (17) between the selected video segment start and end points (153)(154) in the video (125).

The video editor module (150) can further function to display a video segment splice icon (171) which by click event activates the video editor module (150) which functions to allow selection of a first video segment splice point (172) in a first video (125A) a second video splice point (173) in a second video (125B). The video editor module (150) then functions to splice the first video (12A) and the second video (125B) together at the selected first and second video splice points (172)(173) and splices the corresponding global position data streams (9) and correspondingly displays the spliced coordinate location indicators (18) in the geospatial representation (17)(as shown in the example of FIG. 8B).

Now referring primarily to FIG. 9, the geospatial media program (12) can further include an annotation editor module (174). The annotation editor module (174) functions upon execution to allow selection by click event of a coordinate location indicator (18) in the geospatial representation (17) which causes display of an annotation entry field (175) in association with the geospatial representation (17) on the display surface (77). As to particular embodiments, the annotation entry field (175) allows a user (14) to enter annotations (176). Annotations (176) include as illustrative examples: text elements (177) as a sequence of characters or symbols entered into a first annotation entry area (178). As to particular embodiments, a second annotation entry area (179) can include an associated image file selector (180A) which by click event allows selection of image files (132) with image file identifiers (185). As to particular embodiments, a third annotation entry area (181) can include an associated document file selector (180B) which by click event allows selection of document files (183) with document file identifiers (184) displayed in a corresponding image file field (179) and document file field (180) of the annotation entry area (171). By click event of an annotation icon (186) in the annotation entry field (175), the annotations (176) can be associated with the selected coordinate location indicator (18) and the corresponding location coordinates (107).

As to particular embodiments, annotation editor module (170) can further function to activate an optical character recognition encoder (187) which functions to encode, overlay or associate the video image (15) (video frame) corresponding to the selected coordination location indicator (18) with the annotations (172) entered by user (14) interaction into the annotation entry area (171). Annotations (172) overlaid onto a video (125) or video image (15) can include virtually any type of data, including HTML hyperlinks.

Now referring primarily to FIG. 2, the geospatial media program (12) can further include a media output module (182). The media output module (182) functions upon execution to save all the media (141) as media files (16) including all associated video stream data (7), audio stream data (8), global positioning data (9), current date and time data (49) associated with a coordinate location (28) or location coordinates (107) as a package in a compressed searchable format in the media database (78). Since global positioning data (9) and date and time data (49) are saved, the resulting media file (16) can all be searched by date, time or space as well as conventional search criteria by execution of the search module (144). The media output module (182) also allows the media file (16) to be uploaded to the Internet (17).

Now referring generally to FIGS. 1 through 2 and 10 through 20, in particular embodiments, the global positioning data (9) may not, as above described, be embedded in the video stream (3) or the audio stream (4) (as shown in the example of FIG. 1 as arrow 9A). The global positioning data (9) can be discrete from and may not be associated with the video stream (3) or the audio stream (4)(as shown in the example of FIG. 1 as arrows 7A and 8A respectively). The plurality of global positioning data points (46C) within the global positioning data (9) may not be correspondingly associated with an image (134) or any of the plurality of images (193) of a video (125). The video stream (3) and the corresponding video (125) containing a plurality of images (193) and the global positioning signal (5) and the corresponding global positioning data (9), or global positioning data segment(s) (152) containing a plurality of global positioning data points (46C) can each reside separate from one another in one or more server computers (69) or other computing devices or databases. In certain instances, the video recorder (33) can be operated discrete from the global positioning receiver (22) (whether physically separated by distance in space or temporally separated by use in time), while in other instances the video stream (3) can be recorded by the video recorder (33) and the global positioning data (9) can be received by the global positioning receiver (22) concurrently as to space and time. In either event, the video stream data (7) and the global positioning data (9) can remain unassociated and playback of the video (125) does not include location coordinates (107) indicating the location of the video recorder (33) at the time one or more images (134)(193) in the video (125) were recorded. In particular embodiments, the geospatial media program (12) can operate independently and be applied to video stream data (7), audio stream data (8) and global positioning data (9) which may be acquired without processing the video stream (3), the audio stream (4) or the global position signal (5) through a geospatial recorder (2) as above described. Rather the video stream data (7), audio stream data (8) and global positioning data (9) can be acquired as files from one or more remote server computers (69) or other computing devices or databases.

In particular embodiments, each of the global positioning data points (46C) included in the global positioning data (9) or global positioning segment (152) can contain metadata (138) including as illustrative examples: location coordinates (107) whether in two or three-dimensional spherical coordinates or Cartesian coordinates (longitude (29), latitude (30), altitude (31)), Universal Time Coordinated ("UTC") values (189), speed values (190), heading values (191)(which can be associated with cardinal direction), video recorder orientation values (192), focal length, sensed gas concentration values (as partial pressures, quantity per quantity measures (ppm, ppb, . . . ), sensed fluid levels, sensed fluid flow rates, sensed ultraviolet light values, sensor connectivity values (open or closed), or the like. Similarly, each image (134) in the plurality of images (193) contained in a video (125) can include a timestamp (194) including date and time data (49).

Now referring primarily to FIGS. 1 and 2, as to these embodiments, the processor (19) in communication with the non-transitory computer readable media (20) containing the program (21) can further include a synchronization module (188) including computer instructions executable to retrieve a video (125) and retrieve global positioning data (9), or global positioning data segments (152), and can be further executable to associate one or a plurality of global positioning data points (46C) contained in the global positioning data (9), or one or more global positioning data segments (152) with a corresponding video image (134), or a plurality of video images (193) of a video (125). Once one or a plurality of global positioning data points (46C) become correspondingly associated with one image (134) or with a plurality of images (193) of a video (125), the location coordinates (107) can be identified in a geospatial representation (17) depicted in a graphical user interface (13) on the display surface (77) of a computing device (68).

Now referring primarily to FIGS. 1, 2 and 10, in particular embodiments, the processor (19) in communication with a non-transitory computer readable media (20) containing the program (21) can be executed to retrieve the video (125). In certain applications, a user (14) can by indications in the graphical user interface (13), select a video (125) containing a plurality of images (193) for depiction on the display surface (77) of computing devices (68)(as shown in the illustrative example of FIG. 10).

Now referring primarily to FIGS. 1, 2 and 11, in particular embodiments, the program (21) can be further executed to retrieve global positioning data (9), or one or more global positioning data segments (152). In particular embodiments, a user (14) can by indications in the graphical user interface (13), select global positioning data (9), or a global positioning data segment (152) containing a plurality of global positioning data points (46C)(as shown in the illustrative example of FIG. 11).

In particular embodiments, a reference element (211) can be associated with one or both of the video (125) or the global positioning data (9) or a global positioning data segment (152) (as shown in the example of FIG. 2). The synchronization module (188) can, but need not necessarily, apply the reference element (211) to automatically associate the video stream data (7) with the global positioning data (9) without user (14) indications in the graphical user interface (13).

In the illustrative example of FIGS. 12 through 19, the video recorder (33)(or the audio recorder (34)(or both) or the global positioning signal receiver module (22) can be carried by an object (195)(as shown in the example of FIG. 2). In particular embodiments, the video recorder (33)(or the audio recorder (34)(or both) or the global positioning signal receiver module (22) can be carried by an aircraft or a submersible craft (195) whether manned or unmanned. In the example of FIGS. 12 through 19, the video recorder (33)(or the audio recorder (34) or the global positioning signal receiver module (22) can, but need not necessarily, be carried by an unmanned aircraft (195) such as a drone. Accordingly, each of the plurality of global positioning data points (46C) can include location coordinates (107) including values for longitude (29), latitude (30), and altitude (31). However, these illustrative examples are not intended to preclude the video recorder (33)(or the audio recorder (34) or the global positioning signal receiver module (22) from being carried in or on any other type of objects such as (such as buses, cars, robots, drones, bikes, lifts, skate boards, snow boards, or the like), apparel worn by humans or animals (such as coats, gloves, helmets, goggles, boots) or borne by equipment such as skis, ski poles, sleds) or the like.

Now referring primarily to FIGS. 1, 2 and 12, the geospatial representation module (113) can be executed depict a geospatial representation (17) in the graphical user interface (13) depicted on the display surface (77) of a computing device (68). The image or video viewer module (133)(135) can be executed to depict the video (125) in the graphical user interface (13). The synchronization module (188) can be further executed to depict a plurality of coordinate location indicators (18) in the geospatial representation (17) at coordinate locations (28) correspondingly associated with the location coordinates (107) of a plurality of global positioning data points (46C) in the global positioning data (9).

Now referring primarily to FIGS. 1, 2 and 13, in particular embodiments, the synchronization module (188) can be further executed to allow a user (14) by indications in the graphical user interface (13) to select an image (134) in the plurality of images (193) in the video (125) depicted in the graphical user interface (13), and further select one of the plurality of coordinate location indicators (18) depicted in the geospatial representation (17) in the graphical user interface (13). A user (14) can use the navigation controller (116) or image scale control (119) to locate the coordinate location (28) in the geospatial representation (17) corresponding to or closely corresponding to the location coordinates (107) of the subject matter shown in the selected image (134) in the video (125). In the illustrative example, the user (14) can locate the coordinate location (28) (or a close approximation of the coordinate location (28) in the geospatial representation (17)) of the subject matter in the selected image (134).

Now referring primarily to FIGS. 1, 2 and 14, the user (14) by indications in the graphical user interface (13) can select a coordinate location indicator (18) that corresponds or closely corresponds to the location coordinates (107) of the subject matter shown in the selected image (134) in the video (125). The selected image (134), can but need not necessarily be, a beginning video image (197) in the plurality of images (193) in the video (125) and the selected coordinate location indicator (18) can correspond or closely correspond to the location coordinates (107) of the subject matter shown in the beginning video image (197) in the video (125).

Selection of the coordinate location indicator (18) in the geospatial representation (17) activates the synchronization module (188) to associate the corresponding global positioning data point (46C) in the global positioning data (9) with the image (134) selected in the video (125). The synchronization module (188) can function to determine a time offset (199) between the timestamp (194) of the image (134) selected in said plurality of images (193) in the video (125) and a coordinated universal time (189) of the global positioning data point (46C) corresponding to the selected coordinate location indicator (18) in the geospatial representation (17) (as shown in the example of FIG. 1).

In particular embodiments, the synchronization module (188) can further function to determine, based on the time offset (199) between the timestamp (194) of the image (134) selected in said plurality of images (193) in the video (125) and a coordinated universal time (189) of the global positioning data point (46C), a beginning global positioning data point (200) in the plurality of global positioning data points (46C) to match to the beginning video image (197) in said plurality of video images (193)(as shown in the example of FIG. 1). In particular embodiments, the synchronization module (188) can further function to determine, based on the time offset (199) between the timestamp (194) of the image (134) selected in said plurality of images (193) in the video (125) and a coordinated universal time (189) of the global positioning data point (196), an ending global positioning data point (201) in the plurality of global positioning data points (46C) to match to an ending video image (202) in said plurality of video images (193). In particular embodiments, the synchronization module (188) can further function to correspondingly match based on said time offset (199) the plurality of global positioning data points (46C) with one of said plurality of images (193) occurring between the beginning video image (197) in said plurality of images (193) of the video (125) and the ending video image (202) in said plurality of video images (193) (or a subset of the plurality of global positioning points (46C) or a subset of the plurality of images (193) depending on the recording rate of the global positioning data points (46C) and the recording rate of the plurality of images (193) occurring between the beginning global position data point (200) and the ending global positioning data point (201)). In particular embodiments, the synchronization module (188) can further function, based on the metadata associated with each video image (134)(such as coordinate location or orientation of the video recorder (33)) the coordinate locations (107))(or approximate coordinate locations (107)) of the subject matter shown in the selected video image (134).

Now referring primarily to FIGS. 1, 2 and 15, in particular embodiments, the synchronization module (188) can, but need not necessarily, further generate graphical indicia (203) associated with each of said plurality of coordinate location indicators (18) in the geospatial representation (17). The graphical indicia (203) alter visual appearance of the plurality of coordinate location indicators (18) to differentiate the plurality of coordinate location indicators (18) corresponding to the plurality of global positioning data points (46C) matched to the plurality of images (193) occurring between the beginning video image (197) and the ending video image (202) from the plurality of the coordinate indicators (18) corresponding to the plurality of global positioning data points (46C) unmatched to the plurality of images (193) occurring between the beginning video image (197) and the ending video image (202). In the illustrative example of FIG. 15, the plurality of coordinate location indicators (18) corresponding to the plurality of global positioning data points (46C) matched to the plurality of images (193) occurring between the beginning video image (197) and the ending video image (202) are depicted in a light cross hatch which can be differentiated from the plurality of coordinate indicators (18) corresponding to the plurality of global positioning data points (46C) unmatched to the plurality of images (193) occurring between the beginning video image (197) and the ending video image (202) in the plurality of video images (123) which are depicted as open circles.

In particular embodiments, the graphical indicia (203) associated with each of the plurality of coordinate location indicators (18) corresponding to each of said global positioning points (46C) matched to the plurality of images occurring between said beginning video image (197) and said ending video image in said plurality of video images (123) can appear as a first color (204), and the graphic indicia (203) associated with each of said plurality of coordinate location indicators (18) corresponding to each of said global positioning points (46C) unmatched to the plurality of images (193) occurring between said beginning video image (197) and the ending video image (202) in said plurality of video images (123) can appear as a second color (205).

Now referring primarily to FIGS. 1, 2 and 16, the synchronization module (188) can, but need not necessarily, further function to remove the plurality of coordinate location indicators (18) corresponding to each of the plurality of global positioning points (46C) unmatched to the plurality of images (193) occurring between the beginning video image (197) and the ending video image (202) in said plurality of video images (193).

Again, referring primarily to FIG. 16, upon removal of the plurality of coordinate location indicators (18) corresponding to each of the global positioning points (46C) unmatched to the plurality of images (193) occurring between the beginning video image (197) and the ending video image (202), the synchronization module (188) can, but need not necessarily, further function to alter visual appearance of said graphical indicia (203) associated with each of the remaining of the plurality of coordinate location indicators (18) associated with each of said global positioning points (46C) matched to the plurality of images (193) occurring between the beginning video image (107) and the ending video image (202) in the plurality of video images (193). As shown in the illustrative example of FIG. 16, the remaining coordinate location indicators (18) associated with each of said global positioning points (46C) matched to the plurality of images (193) occurring between the beginning video image (107) and the ending video image (202) in said plurality of video images (193) can be depicted in dark cross hatch; although in particular embodiments the graphical indicia (203) could be depicted in a third color (206).

Now referring primarily to FIGS. 1, 2 and 17, upon depiction of each of the plurality of images (193) of the video (125) on the display surface (77) of the computing device (68), the synchronization module (188) can, but need not necessarily, associate an image location identifier (207) with the corresponding one of the coordinate location indicators (18) matched to the depicted video image (15) occurring between the beginning video image (197) and the ending video image (202) in the plurality of video images (193). Upon playback of the video (125), the image location identifier (207) can travel in the geospatial representation (17) in synchronized relation to depiction of each image (134) of the plurality of the images (193) to identify the approximate location of the video recorder (33) when the depicted video image (134) was recorded.

Again, referring primarily to FIG. 17, in particular embodiments, the synchronization module (188) can, but need not necessarily, further function in response to user (14) indications in the graphical user interface (13) to select one of the plurality of coordinate location indicators (18) in the geospatial representation (17) to depict the video image (134) in the plurality of images (193) of the video (125) correspondingly associated with a selected global positioning data point (196).

Now referring primarily to FIGS. 1, 2 and 18, the synchronization module (188) can, but need not necessarily, function to determine one or more of location coordinates (107), UTC values (189) a speed value (190) or heading value (191) related to of movement of the video recording device (33). In particular embodiments, the synchronization module (188) can further function to depict one or more gauges (208) in the graphical user interface (13) which can depict a measure of any metadata (138) value such as identify heading values (191) as cardinal directions (209) and speed values (190) in miles per hour (kilometers per hour) (210), UTC values (189); however, the illustrative example of FIG. 18 is not intended to preclude the use of depictions of other measure of metadata values.

Now referring primarily to FIGS. 1, 2 and 19, as to those embodiments in which each global positioning data point (46C) within the global positioning data (9) or global positioning segment (152) can contain metadata (138), as above described, including location coordinates (107) in three-dimensional spherical coordinates or Cartesian coordinates (longitude (29), latitude (30), altitude (31)), the synchronization module (188) can depict the plurality of coordinate location indicators (18) in a wide and numerous variety of two or three dimension geospatial representations (17) of the Earth (27) or computer aided design models or other three dimensional representations of objects or structures on the surface of the Earth (27).

Now referring generally to FIGS. 1 and 2 and 20 through 33, in particular embodiments, a processor (19) in communication with a non-transitory computer readable media (20) containing the program (21) can be executed to retrieve a video (125) and no corresponding global position data (9) exists whether in whole or in part which can be associated with the plurality of images (134) in the video (125). In the illustrative example of FIGS. 20 through 33, a video recorder (33) carried by an object (195) (in the examples, an unmanned aircraft (195)) can record a video (125); however, the aircraft (195) does not carry a global positioning signal receiver (22). Accordingly, no global positioning data points (46C) are received or stored which can be which can be associated with the plurality of images (134) in the video (125).

Referring to primarily to FIGS. 1, 2 and 20, in particular embodiments, a user (14) can by indications in the graphical user interface (13), select a video (125) containing a plurality of images (15), but no global positioning data (9) can be retrieved or is embedded in the video (125). The geospatial representation module (113) can be executed to depict a geospatial representation (17) in a coordinate encoded space (114) in the graphical user interface (13) depicted on the display surface (77) of a computing device (68).

Referring primarily to FIGS. 1, 2 and 21, in particular embodiments, the synchronization module (188) can be further executed to depict a notification block (212) in the graphical user interface (13) that no global positioning data (9) has been or can be retrieved.

Referring primarily to FIGS. 1, 2 and 22, the video viewer module (136) can be executed to depict the video (125) including a plurality of images (193) in the graphical user interface (13). The synchronization module (188) can be further executed to but cannot depict a plurality of coordinate location indicators (18) in the geospatial representation (17) at coordinate locations (28) because no global positioning data points (46C) global positioning data (9) exist to retrieve or no reference element (211) exists to relate the global positioning data (9) and the video (125).

Referring primarily to FIGS. 1, 2 and 23, the geospatial representation module (113) can be further executed to depict a geospatial representation selection element (213) in the graphical user interface (13) which by user (14) indications allows selection from a numerous and wide variety of different geospatial representations (17) for depiction in the coordinate encoded space (114) of the graphical user interface (13) including as illustrative examples: a two-dimensional coordinate encoded geographic space (214) (as shown in the example of FIG. 23), or three-dimensional coordinate encoded geographic space (215) (as shown in the illustrative example of FIG. 24 thorough 32) including aerial or satellite images, or any other data type which can be encoded with a system of location coordinates (107) including as illustrative examples to two or three dimensional spherical coordinates (216) or Cartesian coordinates (217).

Referring primarily to FIGS. 1, 2 and 24, the geospatial representation module (113) can be further executed to depict the selected geospatial representation (17) by indications in the geospatial representation selection element (213).

Referring primarily to FIGS. 1, 2 and 25, in particular embodiments, the synchronization module (188) can further function to receive user (14) indications in the geospatial representation (17) depicted in the graphical user interface (13) to select location coordinates (107) to associate with a video image (134) depicted in the graphical user interface (13). A user (14) can use the navigation controller (116) to directionally move the geospatial representation (17) on the display surface (77) to display portions of the geospatial representation (17) which include the location coordinates (107) from which the video recorder (33) recorded the video image (134) depicted on the graphical user interface (13). The user (14) by indications in the geospatial representation (17) can select location coordinates (107) in the geospatial representation (17) and the synchronization module (188) correspondingly associate the location coordinates (107) with video image (134) depicted in the graphical user interface (13). As an illustrative example, a user (14) can move a pointer (105) in the geospatial representation and by click event selects first location coordinates (107*a*) (shown in the example of FIG. 26) in the geospatial representation (17) which activates the synchronization module (188) to associate the first location coordinates (107*a*) with the depicted first video image (134*a*)(which can, but need not necessarily, be the beginning video image (197)).

Referring primarily to FIGS. 1, 2 and 26, in particular embodiments, the synchronization module (188) can further function to depict a first coordinate location indicator (18*a*) in the geospatial representation (17) at the first location coordinates (107*a*) selected by the user (14) in said geospatial representation (17). As shown in the illustrative example of FIG. 25, the selected first location coordinates (107*a*) be associated with the beginning video image (134*a*) of a plurality of images (193) in a video (125); however, this does not preclude depiction of a first video image (134*a*) that may occur between the beginning video image (197) and the ending video image (202) in the video (125) or video segment (151).

Referring primarily to FIGS. 1, 2 and 27, in particular embodiments, the user (14) can select a second video image (134*b*) in the plurality of images (193) in the video (125). The user (14) can use the navigation controller (116) to directionally move the geospatial representation (17) on the display surface (77) to display portions of the geospatial representation (17) which include second location coordinates (107*b*) from which the video recorder (33) recorded the second video image (134*b*) depicted on the graphical user interface (13). The user (14) by indications in the geospatial representation (17) can select second location coordinates (107*b*) in said geospatial representation (17) and the synchronization module (188) correspondingly associates the second location coordinates (107*b*) with second video image (134*b*) depicted in the graphical user interface (13).

Referring primarily to FIGS. 1, 2 and 28, in particular embodiments, the synchronization module (188) can further function to depict a second coordinate location indicator (18*b*) in the geospatial representation (17) at the location coordinates (107*b*) selected by the user (14) in said geospatial representation (17).

Referring primarily to FIGS. 1, 2 and 29, in particular embodiments, the user (14) can select a third or more video images (134*c*, 134*d* . . . ) in the plurality of images (193) in the video (125). As to each of the third or more video images (134*c*, 134*d* . . . ) selected by the user (14) for depiction in the graphical user interface (13), the user (14) can use the navigation controller (116) to directionally move the geospatial representation (17) on the display surface (77) to display portions of the geospatial representation (17) which include corresponding third or more location coordinates (107*c*, 107*d* . . . ) from which the video recorder (33) recorded each of the third or more video images (134*c*, 134*d* . . . ) depicted on the graphical user interface (13). The user (14) by indications in the geospatial representation (17) can correspondingly select third or more location coordinates (107*c*, 107*d* . . . ) in the geospatial representation (17) and the synchronization module (188) correspondingly associates the third or more location coordinates (107*c*, 107*d* . . . ) with the third or more video images (134*c*, 134*d* . . . ) depicted in the graphical user interface (13). The synchronization module (188) can further function to correspondingly depict a third or more coordinate location indicators (18*c*, 18*d* . . . ) in the geospatial representation (17) at the location coordinates (107*c*, 107*d* . . . ) selected by the user (14) in said geospatial representation (17).

Referring primarily to FIGS. 1, 2 and 30, in particular embodiments, the user (14) can select a final video image (134*f*) (which can be the ending video image (202) in the plurality of images (193) in the video (125). The user (14) can use the navigation controller (116) to directionally move the geospatial representation (17) on the display surface (77) to display portions of the geospatial representation (17) which include the final location coordinates (107*f*) from which the video recorder (33) recorded the ending video image (202) depicted on the graphical user interface (13). The user (14) by indications in the geospatial representation (17) can select final location coordinates (107*f*) in said geospatial representation (17) and the synchronization module (188) correspondingly associates the final location coordinates (107*f*) with the final video image (134*f*) (which can be the ending video image (202)) depicted in the graphical user interface (13). The synchronization module (188) can further function to correspondingly depict a final coordinate location indications (18*f*) in the geospatial representation (17) at the location coordinates (107*f*) selected by the user (14) as the location coordinates (107*f*) of video recorder at the time the final video image (18*f*) was recorded.

Again, referring to FIG. 30, in particular embodiments, the synchronization module (188) can further function to interpolate between the location coordinates (107) selected in the geospatial representation (17) to generate additional location coordinates (107i) which can be correspondingly associated with a plurality of images (193) occurring between selected images (134) in the video (125). In one illustrative example, the synchronization module (188) can interpolate between the location coordinates (107c) depicted by coordinate location identifier (18c) of the video recorder (33) and location coordinates (107f) selected in the geospatial representation (17) based on an assumed constant speed value (190), or appended metadata (138) including an actual speed value (190) in one or more of the plurality of images (134) over the shortest distance between location coordinates (107c and 107f) selected in the geospatial representation (17). In another example, a route (218) between two location coordinates (107) can be entered into the geospatial representation (17) and an assumed constant speed value (190), or appended metadata (138) including an actual speed value (190) in one or more of the plurality of images (134), location coordinates (107) can be interpolated over the route (218). The interpolated location coordinates (17) can be represented by location coordinate indicators (18i) in the geospatial representation (17). In a further example, the length of a video (125) can be determined and the frequency (44) of the global position data (9) can be determined utilized to associate the correct global positioning data (9) with each image (134) of the plurality of images (193) in the video (125).

Referring primarily to FIGS. 1, 2 and 31, in particular embodiments, the synchronization module (188) can depict a synchronization icon (218) in the graphical user interface (13) which upon user (14) interaction further activates the synchronization module (188) to associate each of the video images (134) selected in the video by the user (14) with the corresponding location coordinates (107) selected by the user (14) in the geospatial representation (17). In particular embodiments, the synchronization module (188) can depict a synchronization completion message block (219) in the graphical user interface which informs the user (14) that the association between the selected coordinate locations (107) in the geospatial representation (17) with the selected video images (134) depicted in the has been completed.

Referring primarily to FIGS. 1, 2 and 32, depiction of each of the plurality of images (123) of the video (125) on the display surface (77) of the computing device (68), the synchronization module (188) can, but need not necessarily, associate an image location identifier (207) with the corresponding one of the coordinate location indicators (18) matched to the depicted video image (15) occurring between the beginning video image (197) and the ending video image (202) in said plurality of video images (193). Upon playback of the video (125), the image location identifier (207) can travel in the geospatial representation (17) in synchronized relation to the depiction of the plurality of the images (193) to identify the approximate location of the video recorder (33) when the depicted video image (15) was recorded.

Referring primarily to FIGS. 1, 2 and 33, the graphical user interface (13) can be implemented using various technologies and different devices, depending on the preferences of the designer and the particular efficiencies desired for a given circumstance. In the illustrative example of FIG. 33, the depiction of the geospatial representation (17) and the depiction of the video (125) can be disposed at different areas of the display surface (77). The geospatial representation selection element (213) can by user (14) indications be interchanged to depict the location coordinate indicators (18) in a geospatial representation (17) that provides a coordinate system compatible with two dimensional or three-dimension location coordinates (107) associated with the video (125).

In particular embodiments, the video (125) and associated global positioning data (9) can be separately stored in one or more server computers (69) with a reference element (211) which allows retrieval of the video (125) associated with the global positioning data (9). As to other embodiments, the global positioning data (9) can be associated by embedding at intervals in the video stream (3) or the audio stream (4), for example, as a text overlay element (45) of the video stream data (7). As yet another alternative, embedding can be accomplished as closed captioning text which can be as part of or discrete from a video (125).

As can be easily understood from the foregoing, the basic concepts of the present invention may be embodied in a variety of ways. The invention involves numerous and varied embodiments of a geospatial recorder and a geospatial recording system and methods for making and using the geospatial recorder and geospatial recording system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "geospatial recorder" should be understood to encompass disclosure of the act of "geospatial recording"—whether explicitly discussed or not—and, conversely, were there effectively disclosure of the act of "geospatial recording", such a disclosure should be understood to encompass disclosure of a "geospatial recorder" and even a "means for geospatial recording." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the geospatial recorders and the geospatial recording system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A computer implemented system, comprising: a processor in communication with a non-transitory computer readable media containing computer instructions executable to: depict a video including a plurality of images on a display surface of a computing device, said video having no corresponding reference element matched to a global positioning system log; depict a geospatial representation encoded with a coordinate system on said display surface of said computing device; select by user indications in said computing device an image from said plurality of images in said video; select by user indications in said geospatial representation a coordinate location in said geospatial representation; and associate said coordinate locations selected in said geospatial representation with said image selected from said plurality of images in said video.

2. The system of claim 1, wherein said computer instructions further executable to depict a location coordinate indicator at said coordinate locations selected in said geospatial representation.

3. The system of claim 2, wherein said computer instructions further executable to:
   associate an image location identifier with said location coordinate indicators depicted in said geospatial representation; and
   activate said image location identifiers in said geospatial representation upon depiction of said image associated with said coordinate locations selected in said a geospatial representation.

4. The system of claim 3, wherein said computer instructions further executable to:
   interpolate between a pair of coordinate locations selected in said geospatial representation;
   populate said geographic representation with interpolated coordinate locations between said pair coordinate locations selected in said geospatial representation selected by user indications in said computing device; and
   correspondingly associate said interpolated coordinate locations in said geographic representation with a plurality of images between a pair of images selected from said video.

5. The system of claim 1, wherein said system comprises a two-dimensional coordinate encoded geographic space, wherein location coordinates include two dimensional spherical coordinates or Cartesian coordinates.

6. The system of claim 5, wherein said coordinate system comprises a three-dimensional coordinate system, wherein location coordinates include three-dimensional spherical coordinates or Cartesian coordinates.

7. The system of claim 5, wherein said three-dimensional coordinate system attributes to each of said location coordinates a longitude, a latitude and an altitude.

8. The system of claim 1, wherein said coordinate locations selected in said geospatial representation correspond to image capture location coordinates of said image-selected from said video.

9. The system of claim 1, wherein said computer instructions further executable to:
 correspondingly associate each of a plurality of coordinate locations occurring between beginning coordinate locations and ending coordinate locations selected by user indication in said geospatial representation with each of a plurality of images occurring between a beginning image and an ending image selected from said video.

10. A computer implemented system, comprising:
 a processor in communication with a non-transitory computer readable media containing computer instructions executable to:
 depict a video including a plurality of images on a display surface of a computing device;
 depict a geospatial representation encoded with a coordinate system on said display surface of said computing device;
 determine if said video has a reference matched to a global positioning system log;
 depict, in absence of said reference matched to said global positioning system log, a notice on said display surface of said computing device to select said location coordinates in said geographic representation;
 select by user indications in said computing device an image from said plurality of images in said video;
 select by user indications in said geospatial representation a coordinate location in said geospatial representation; and
 associate said coordinate locations selected in said geospatial representation with said image selected from said plurality of images in said video.

* * * * *